(12) United States Patent
Chung et al.

(10) Patent No.: US 8,711,315 B2
(45) Date of Patent: Apr. 29, 2014

(54) LIQUID CRYSTAL DISPLAY HAVING PARTICULAR PIXEL STRUCTURE

(75) Inventors: Te-Chen Chung, KunShan (CN); Yongqian Li, KunShan (CN); Wenjun Dai, KunShan (CN); Chia-Te Liao, KunShan (CN)

(73) Assignee: Infovision Optoelectronics(Kunshan)Co., Ltd., Kunshan (CN)

( * ) Notice: Subject to any disclaimer, the term of this patent is extended or adjusted under 35 U.S.C. 154(b) by 159 days.

(21) Appl. No.: 13/558,352

(22) Filed: Jul. 26, 2012

(65) Prior Publication Data

US 2013/0033665 A1 Feb. 7, 2013

(30) Foreign Application Priority Data

Aug. 1, 2011 (CN) .......................... 2011 1 0225983
Apr. 25, 2012 (CN) .......................... 2012 1 0123880

(51) Int. Cl.
*G02F 1/1343* (2006.01)
*G02F 1/1337* (2006.01)

(52) U.S. Cl.
USPC ............................ 349/146; 349/147; 349/123

(58) Field of Classification Search
USPC .......................................... 349/146, 147, 123
See application file for complete search history.

(56) References Cited

U.S. PATENT DOCUMENTS

2013/0033666 A1* 2/2013 Chung et al. .................. 349/126

* cited by examiner

*Primary Examiner* — Mike Qi
(74) *Attorney, Agent, or Firm* — Ding Yu Tan

(57) ABSTRACT

An LCD includes a first substrate, a second substrate, a liquid crystal layer between the first and second substrates, first and second alignment films respectively disposed on the first and second substrates. The first substrate comprises multiple scanning lines and multiple data lines intercrossed with the multiple scanning lines to define multiple pixel areas. Each pixel area comprises multiple electrically interconnected first electrodes and multiple electrically interconnected second electrodes. The first electrodes and the second electrodes are disposed on different layers and mutually intersected to define multiple sub-pixel areas. Each sub-pixel area further comprises two protrusion-shaped patterns facing each other on two adjacent first electrodes where the first electrodes and the second electrodes are not overlapped. An angle within a range of 5-20 degrees is defined between the vertex connection direction of the two protrusion-shaped patterns facing each other and the rubbing direction of the first and second alignment films.

18 Claims, 29 Drawing Sheets

LIQUID CRYSTAL DISPLAY HAVING PARTICULAR PIXEL STRUCTURE

CROSS-REFERENCE TO RELATED APPLICATIONS

This application claims the priority benefit of Chinese Patent Application No. 201110225983.5, filed on Aug. 1, 2011, and Chinese patent application No. 201210123880.2, filed on Apr. 25, 2012. The entirety of the above-mentioned patent applications is hereby incorporated by reference herein and made a part of this specification.

TECHNICAL FIELD

This description relates to display technologies, and more particularly relates to a liquid crystal display (LCD).

DESCRIPTION OF BACKGROUND

TFT-LCDs (Thin Film Transistor-Liquid Crystal Displays) are widely used in the field of flat panel display because of their low radiation, thinness and low power consumption etc. Most of the desktop TFT-LCDs are based on the TN (Twisted Nematic) mode, however, two electrodes of TN-type liquid crystal displays are respectively formed on the upper and lower substrates, and the liquid crystal molecules rotate in a plane orthogonal to the substrates. Due to the optical anisotropy of liquid crystal molecules, the optical path lengths of the light entering the human eyes after passing by the liquid crystal molecules from different angles are different; this inevitably leads to the viewing angle problem.

In order to solve the viewing angle problem, the TN type LCDs are commonly added a viewing angle compensation film thereon when they are personally used or used in office environments where high requirement of viewing angle is not asked for. While, requirements of viewing angles for television and handheld PDA (Personal Digital Assistant) products are higher, several new LCD display models, such as the FFS (Fringe Field Switching) mode, IPS (In-Plane Switching) mode are applied to the related products. FIG. 1 discloses a cross-sectional structure of an existing FFS type LCD. As shown in FIG. 1, both of the first electrode 81 and the second electrode 82 of the FFS type LCD 800 are formed on the bottom substrate and disposed on different layers; and in the pixel areas, the first electrode 81 is configured as an entire plane but the second electrode 82 is configured in strips. FIG. 2 discloses a cross-sectional structure of an existing IPS type LCD. As shown in FIG. 2, both of the first electrode 91 and the second electrode 92 of the IPS type LCD 900 are formed on the bottom substrate and disposed on the same layer; and in the pixel areas, the first electrode 91 and the second electrode 92 are configured by interlaced strips. Since in the FFS type LCD 800 and the IPS type LCD 900, the first electrodes 81, 91 and the second electrodes 82, 92 are formed on the same substrate, the liquid crystal molecules rotate in a plane parallel to the substrate, and thus the viewing angle characteristics can be improved to achieve a wide viewing angle display.

For the TN type LCDs added with a viewing angle compensation film with low technical threshold, they are widely used. However, because the compensation film is fixed, it cannot be realized to compensate for arbitrary gray scale at any angle. Therefore, the inherent gray scale inversion phenomenon in the TN type LCDs still remains. For the FFS type and IPS type LCDs with high technical threshold, they are monopolized by patent owners with high royalties.

Therefore, it is necessary to provide improved technical solutions to overcome the above technical problems in the existing technology.

SUMMARY

The present embodiment is to provide an LCD having wider viewing angle scope, higher transmittance, and shorter response time.

To solve these technical problems, the present embodiment provides a LCD including a first substrate, a second substrate opposing to the first substrate, a liquid crystal layer sandwiched between the first substrate and the second substrate, a first alignment film disposed on the first substrate and a second alignment film disposed on the second substrate. The first substrate comprises multiple scanning lines and multiple data lines intercrossed with the multiple scanning lines to define multiple pixel areas. Each pixel area comprises multiple first electrodes which are electrically interconnected together and multiple second electrodes which are electrically interconnected together. The first electrodes and the second electrodes are disposed on different layers and mutually intersected to define multiple sub-pixel areas. Each sub-pixel area further comprises two protrusion-shaped patterns facing each other. The protrusion-shaped patterns are configured on two adjacent first electrodes where the first electrodes and the second electrodes are not overlapped. An angle within a range of 5-20 degrees is defined between the vertex connection direction of the two protrusion-shaped patterns facing each other and the rubbing direction of the first alignment film and the second alignment film.

The LCD of the present embodiment has electrodes mutually intersected in each pixel area and two protrusion-shaped patterns facing each other in each sub-pixel area, and the angle between the vertex connection direction of the two protrusion-shaped patterns and the rubbing direction of the first alignment film and the second alignment film is within the range of 5-20 degrees. This ensures the liquid crystal molecules to be twisted toward a same direction when the LCD is working, so that the LCD can achieve a wider viewing angle scope, higher transmittance, and shorter response time.

Moreover, the LCD of the present embodiment adopts a display mode different from the existing FFS and IPS display mode. It is of great significance to break the technology monopoly for FFS and IPS type LCDs.

Other aspects and features of the present invention become apparent through the following detailed explanation referring to the drawings. But it should be aware that the drawings are only for the purposes of interpretation, rather than the scope limit of the invention which should refer to the attached claims. Also it should be aware that the drawings are only trying to illustrate the concept of the structures and processes described here, they are unnecessary to be accurately scaled unless otherwise indicated.

DETAILED DESCRIPTION OF THE EMBODIMENTS

Figure 1:
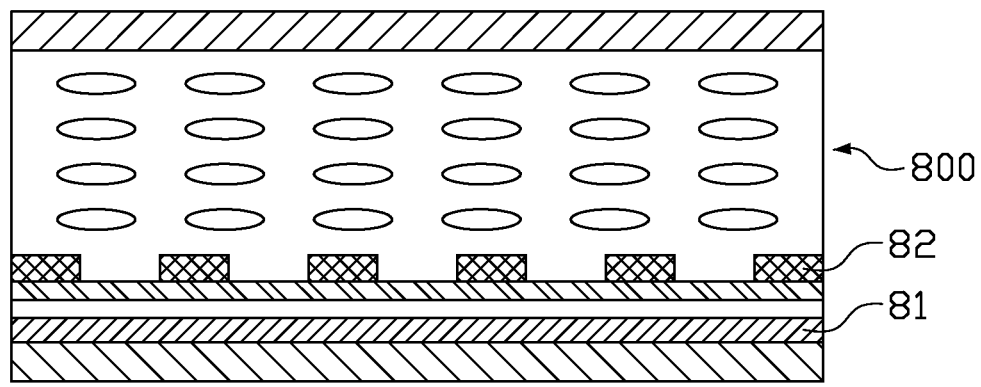
FIG. 1 is a cross-sectional view of an existing FFS type LCD.
Figure 2:
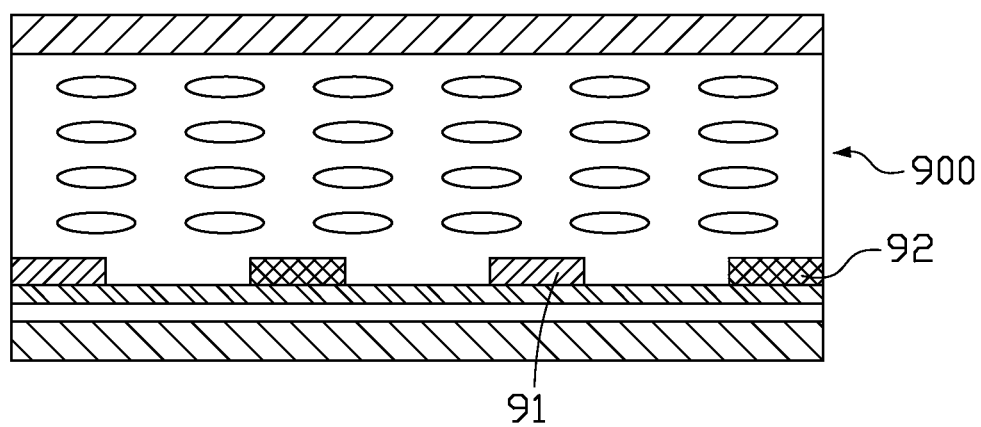
FIG. 2 is a cross-sectional view of an existing IPS type LCD.

In order to make the above-mentioned objects, features and advantages of the present invention more obvious and easily understood, the following detailed description will be made combined with the accompanying drawings on the embodiments of the present invention.

It should be noted that, the drawings of the description only show the relevant structural features of the present embodiment, and other structural features are omitted for purpose of clarity.

An LCD according to the present embodiment comprises a first substrate 100, 200, 300, 400 and a second substrate (not shown) which are disposed oppositely, and a liquid crystal layer (not shown) sandwiched between the first substrate 100, 200, 300, 400 and the second substrate. The first substrate 100, 200, 300, 400 of the present embodiment can have multiple implementations, thus multiple LCDs can be implemented respectively, based on the various first substrates 100, 200, 300, 400. The LCD of the present embodiment, especially the first substrate 100, 200, 300, 400 of the LCD and the pixel structures are described in detail hereafter. The term "multiple" referred to herein in the instant disclosure is the same as "a plurality of". In other words, multiple and a plurality of can be used interchangeably.

First Embodiment

FIGS. 3-4 and FIGS. 5a-5c illustrate the first substrate 100 of the LCD according to a first embodiment. For purpose of clarity, FIG. 3 only shows one pixel area P of the first substrate 100. As shown in FIGS. 3-4 and FIGS. 5a-5c, the first substrate 100 of the LCD according to the first embodiment comprises a transparent substrate 10, and multiple scanning lines 11, multiple data lines 12, and thin-film transistors 14 formed on the transparent substrate 10. The thin-film transistors 14 are disposed at the intersections of the scanning lines 11 and the data lines 12. Each thin-film transistor 14 comprises a gate electrode 141 electrically connected to the corresponding scanning line 11, a semiconductor layer 142, a source electrode 143 electrically connected to the corresponding data line 12, and a drain electrode 144 electrically connected to the pixel electrode. The scanning lines 11 are intercrossed with the data lines 12 to define multiple pixel areas P, that is, two adjacent scanning lines 11 are intercrossed with two adjacent data lines 12 to define a pixel area P.

Figure 3:
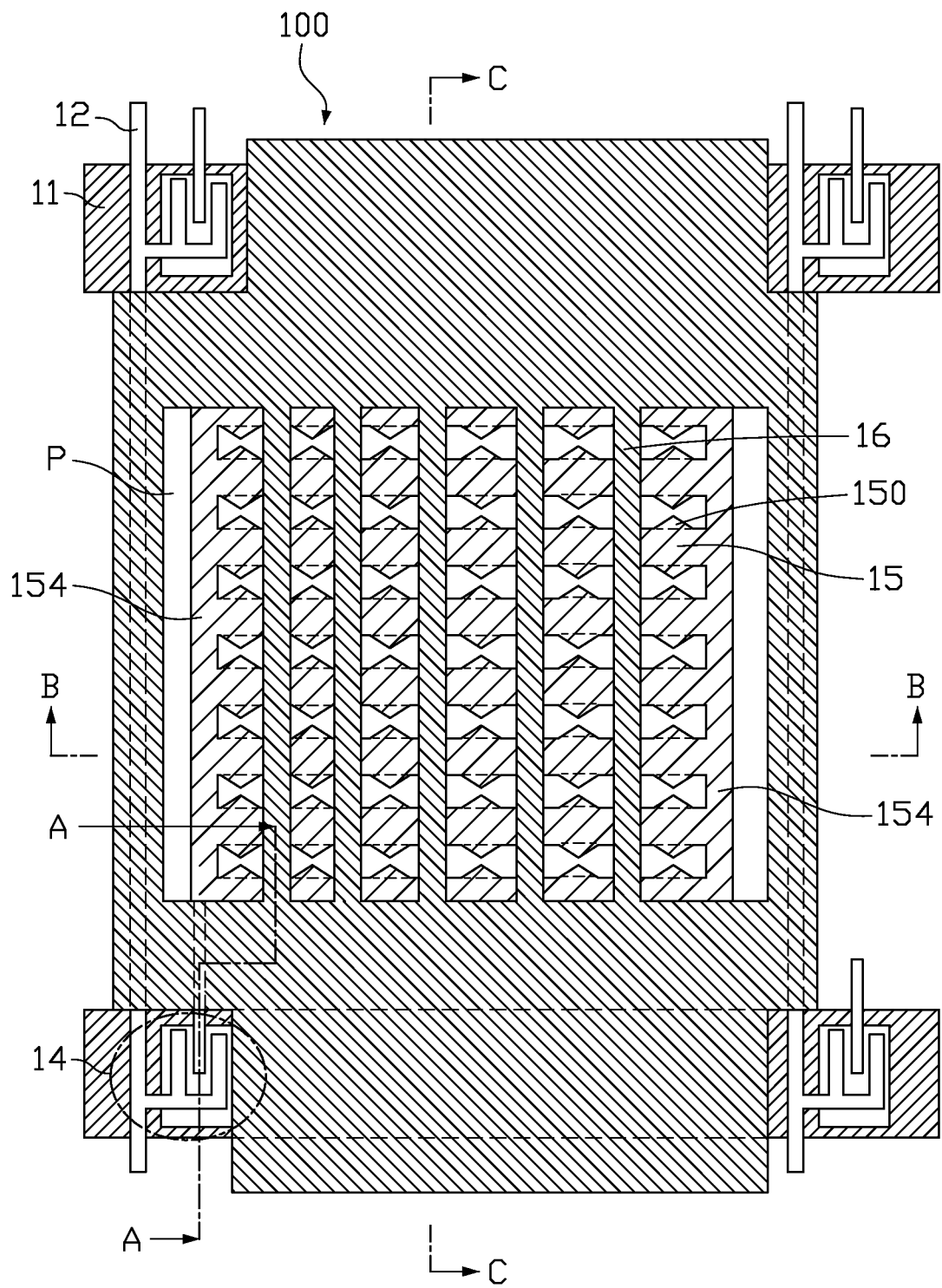
FIG. 3 is a planar view of a first substrate of an LCD according to a first embodiment.

Each pixel area. P comprises multiple first electrodes 15 electrically interconnected together and multiple second electrodes 16 electrically interconnected together. In the first embodiment, the first electrodes 15 are electrically interconnected together through multiple electrode junction bars 154 which are parallel to the second electrodes 16 and located at a border of the corresponding pixel area P. In the first embodiment, the first electrodes 15, the second electrodes 16 and the electrode junction bars 154 are transparent electrodes, and formed by, for example, ITO (Indium Tin Oxide) or other transparent conductive materials. The first electrodes 15 and the second electrodes 16 are located on different layers with an insulating layer disposed therebetween. The first electrodes 15 and the second electrodes 16 are mutually intersected to define multiple sub-pixel areas P1. Preferably, each pixel area P comprises at least four or more sub-pixel areas P1, thereby improving the transmittance. The amount of the sub-pixel areas P1 as shown in FIG. 3 is for explanation convenience only and cannot be used to limit the scope of the present invention. In fact, the amount of the sub-pixel areas P1 of the present embodiment can be reasonably chosen according to actual size and process conditions of the LCD.

Figure 4:
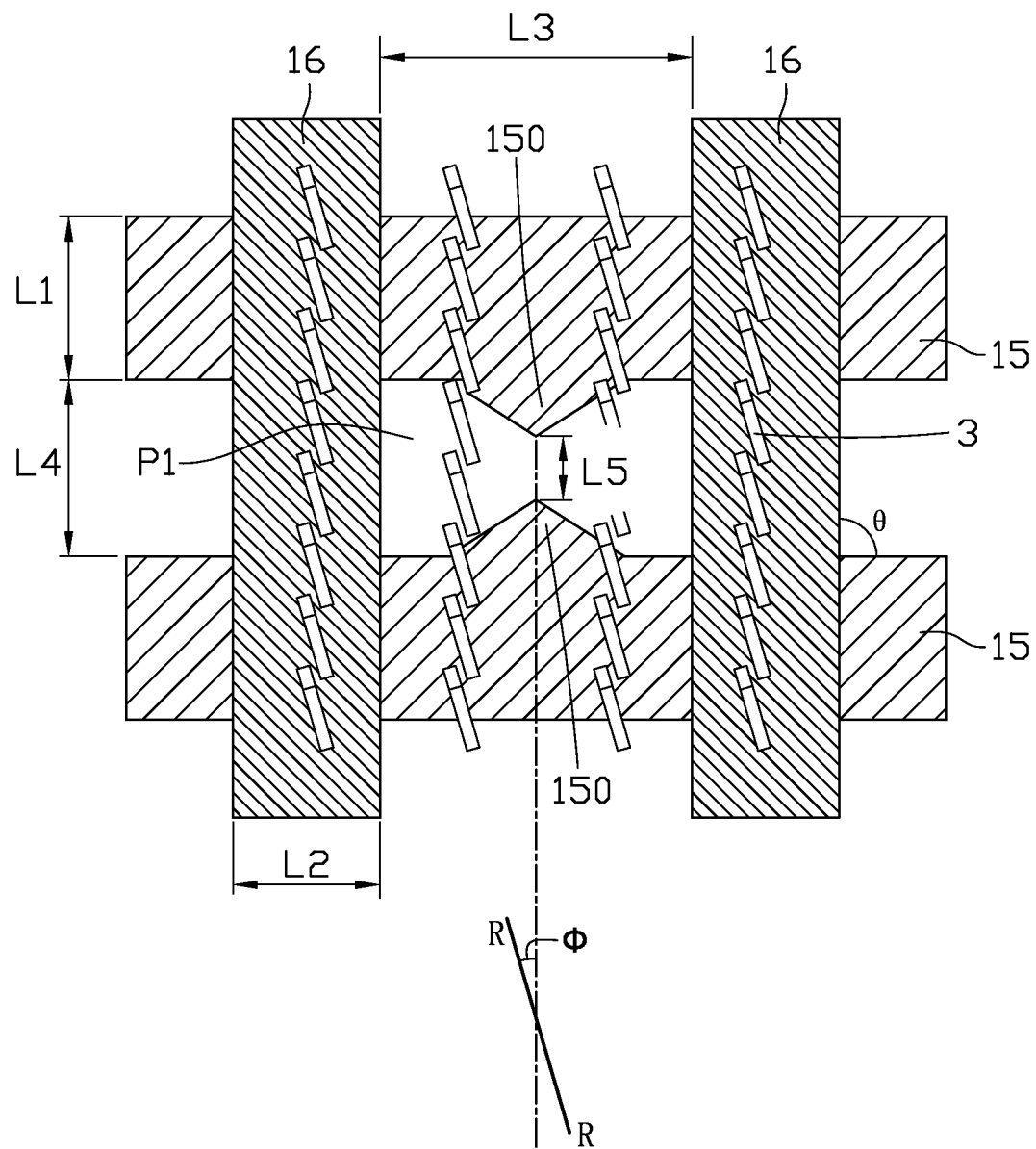
FIG. 4 is a partially enlarged view of a sub-pixel area of FIG. 3.

As shown in FIG. 3 and FIG. 4, in each sub-pixel area P1 of the first embodiment, two protrusion-shaped patterns 150 facing each other are formed on the first electrodes 15, where the first electrodes 15 and the second electrodes 16 are not overlapped. The protrusion-shaped patterns 150 are triangular protrusion-shaped patterns or curved protrusion-shaped patterns, such as semi-circular protrusion-shaped patterns or any other protrusion-shaped patterns with a curved edge. In order to facilitate the description, triangular protrusion-shaped patterns 150 are used as an example to illustrate the embodiments of the present invention.

The triangular protrusion-shaped patterns 150 are disposed on a middle of corresponding first electrodes 15 of the sub-pixel area P1, so as to ensure symmetry of the electric field generated by the sub-pixel area P1 during operation of the LCD. Preferably, all triangular protrusion-shaped patterns 150 have the same structure so as to ensure the uniformity of the electric field generated by the entire pixel area P during work of the LCD.

The LCD of the present embodiment also comprises a first alignment film (not shown) disposed on the first substrate 100 and a second alignment film (not shown) disposed on the second substrate. In the first embodiment, an angle φ within a range of 5-20 degrees is defined between the rubbing direction of the first alignment film and the second alignment film and the vertex connection direction of the protrusion-shaped patterns 150 facing each other in each sub-pixel area. P1. Preferably, the angle φ is 7 degrees, which enables the initial torques of the liquid crystal molecules 3 to twist toward in one direction, to get a larger torque and shorter response time, and makes the liquid crystal molecules 3 twisted toward in a same direction to increase the transmittance of the LCD.

As shown in FIG. 3, in the present embodiment, the first electrodes 15 are substantially parallel strips and the second electrodes 16 also are substantially parallel strips.

As shown in FIG. 3 and FIG. 4, an angle θ between the first electrodes 15 and the second electrodes 16 is within a range of 50-150 degrees, which allows the liquid crystal molecules 3 to have a faster response speed. In the first embodiment, the first electrodes 15 and the second electrodes 16 are perpendicular to each other. Specifically, the first electrodes 15 are substantially parallel to the scanning line 11 and the second electrodes 16 are substantially parallel to the data line 12, which makes the LCD to have a more regular pixel structure. However, the arrangement of the first electrodes 15 and the second electrodes 16 of the present embodiment is not limited as the above-mentioned. Practically, the first electrodes 15 can also be substantially parallel to the data line 12 and the second electrodes 16 are thus substantially parallel to the scanning line 11.

As shown in FIG. 4, an internal angle of each triangular protrusion-shaped pattern 150 near the corresponding first electrode 15 is within a range of 0-60 degrees, thereby the liquid crystal molecules 3 can rotate faster and transmittance can thereby be increased.

Figure 5A:
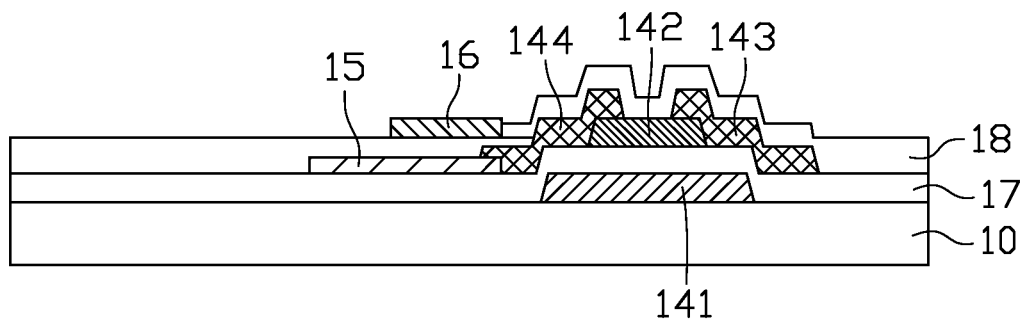
FIG. 5a is a cross-sectional view of FIG. 3 taken along the A-A line.
Figure 5B:
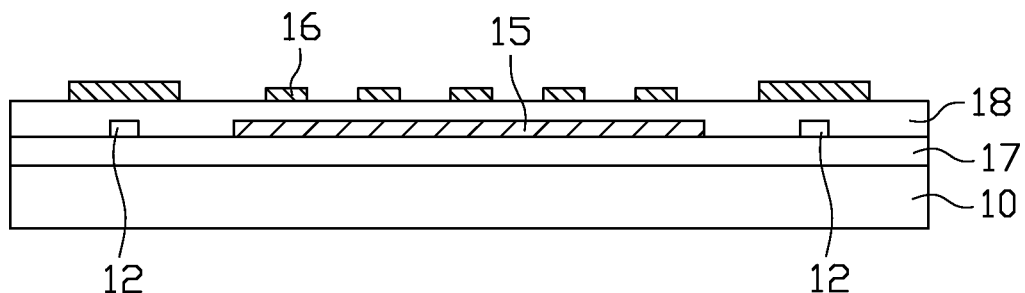
FIG. 5b is a cross-sectional view of FIG. 3 taken along the B-B line.
Figure 5C:
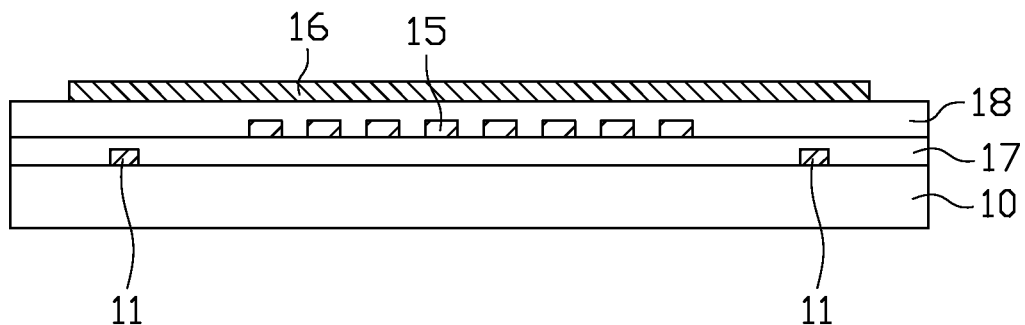
FIG. 5c is a cross-sectional view of FIG. 3 taken along the C-C line.

As shown in FIGS. 5a-5c, in the first substrate 100 of the first embodiment, the first electrodes 15 are the pixel electrodes electrically connected to the drain electrode 144 of the thin-film transistor 14, and the triangular protrusion-shaped patterns 150 are configured on the pixel electrodes. The second electrodes 16 are common electrodes. And in the first substrate 100 of the first embodiment, the pixel electrodes are disposed at a lower layer, and the common electrodes are disposed on an upper layer. That is, the common electrodes are disposed above the pixel electrodes, and the insulating layer sandwiched between the pixel electrodes and the common electrodes is a passivation layer 18.

Contrasted with the existing FFS type LCD in which the upper electrodes are configured by strips in the entire pixel area P but the lower electrodes are configured by an entire plane in the entire pixel area P, the main advantages of the LCD of the present embodiment are that all the upper and lower electrodes of the first substrate 100 are configured by strips in the entire pixel area P, only part of the upper electrodes in the entire pixel area P are overlaid by the transparent lower electrodes because the lower electrodes are configured by strips, which facilitates to increase the transmittance.

In the LCD of the present embodiment, the first electrodes 15 and the second electrodes 16 are disposed on the first substrate 100, and the first electrodes 15 and the second electrodes 16 are separated by an insulating layer. The first electrodes 15 and the second electrodes 16 are mutually intersected, and in each sub-pixel areas P1 enclosed by the first electrodes 15 and the second electrodes 16, the triangular protrusion-shaped patterns 150 are formed on the first electrodes 15 where the first electrodes 15 and the second electrodes 16 are not overlapped. Since the LCD of the present embodiment has mutually intersected the first electrodes 15 and the second electrodes 16 and the triangular protrusion-shaped patterns 150, marginal electric field and horizontal electric field are generated in each sub-pixel area P1 when a voltage difference is applied between the first electrodes 15 and the second electrodes 16, as shown in FIG. 4. The marginal electric field and the horizontal electric field are applied on the liquid crystal molecules 3 that can push the liquid crystal molecules 3 to rotate faster, thus the response time of the liquid crystal molecules 3 can be decreased. Additionally, both of the marginal electric field and the horizontal electric field are applied on the liquid crystal molecules 3 that can help to decrease the driving voltage of the liquid crystal molecules 3, and finally the transmittance of the LCD can be increased. The LCD of the present embodiment adopts a display mode different from the existing FFS and IPS display modes. Contrasted with the existing FFS type and IPS type LCDs, the LCD of the present embodiment achieves the advantages of the LCDs in FFS and IPS display modes. It is of great significance to break technology monopoly for FFS and IPS type LCDs.

In addition, the storage capacitor of each pixel in the LCD of the present embodiment exists only where the first electrodes 15 and the second electrodes 16 are overlapped. Contrasted with the FFS type LCD, the storage capacitors of the present embodiment occupy a smaller area; thus, the insulating layer between the first electrodes 15 and the second electrodes 16 of the LCD of the present embodiment can be thinner contrasting with that of the FFS type LCD to reduce the consumption of CVD (Chemical Vapor Deposition). Therefore, the manufacturing process of the LCD of the present embodiment is faster than that of the FFS type LCDs, thereby improving the yield.

Figure 6:
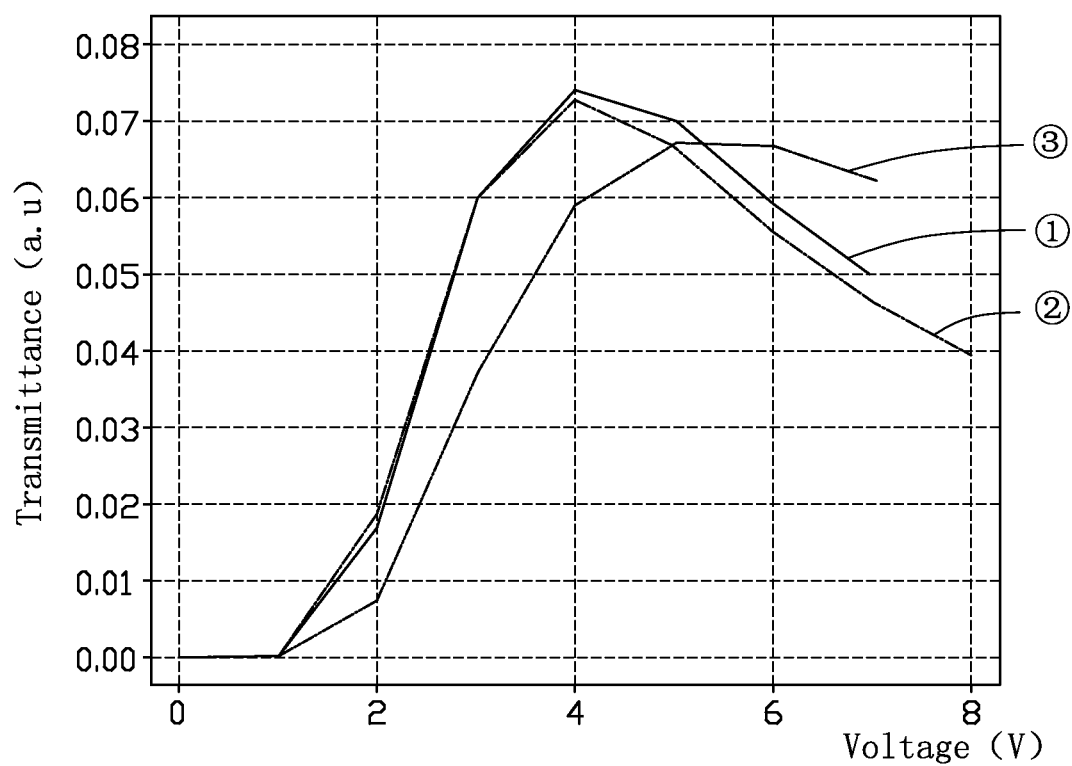
FIG. 6 is a diagram for contrasting the transmittance/voltage curve of the LCD of the first embodiment with those of two additional LCDs.

FIG. 6 is a diagram for contrasting the transmittance/voltage curve of the LCD of the first embodiment with those of two additional LCDs. In FIG. 6, curves ①, ② and ③ are generated in the same simulation conditions. Curve ① is the transmittance/voltage curve of the LCD of the first embodiment having intersected electrodes structure and triangular protrusion-shaped patterns structure, curve ② is the transmittance/voltage curve of a FFS type LCD, and curve ③ is the transmittance/voltage curve of the LCD having intersected electrodes structure but without triangular protrusion-shaped patterns structure. As shown in FIG. 6, it can be seen from curve ③ that the transmittance of the LCD is higher when the first electrodes 15 and the second electrodes 16 disposed on different layers are mutually intersected. However, it can be seen clearly from curve ② and curve ③, the transmittance of the LCD only having intersected first electrodes 15 and second electrodes 16 is not yet as high as that of the FFS type LCD. Contrasting curve ① and curve ③ of FIG. 6, intersected electrodes structure and triangular protrusion-shaped patterns structure applied in the LCD can greatly increase the transmittance; that is, the LCD with triangular protrusion-shaped patterns structure is superior to the LCD without triangular protrusion-shaped patterns structure, in aspects of transmittance. Furthermore, contrasting curve ① and curve ② of FIG. 6, it can be seen clearly that the LCD with intersected electrodes structure and triangular protrusion-shaped patterns structure according to the first embodiment has higher transmittance than the FFS type LCD.

Figure 7:
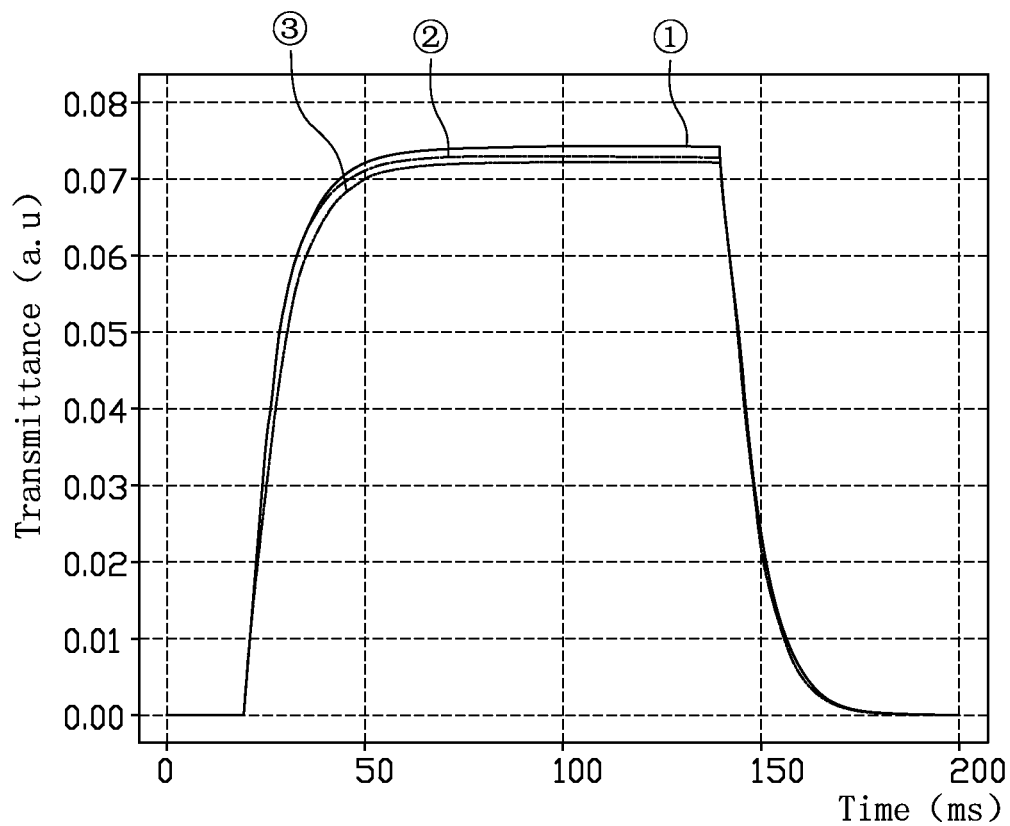
FIG. 7 is a diagram for contrasting the transmittance/time curve of the LCD according to the first embodiment with those of two additional LCDs.

FIG. 7 is a diagram for contrasting the transmittance/time curve of the LCD of the first embodiment with those of two additional LCDs. In FIG. 7, curves ①, ② and (are generated in the same simulation conditions. Curve ① is the transmittance/time curve of the LCD of the first embodiment having intersected electrodes structure and triangular protrusion-shaped patterns structure, curve ② is the transmittance/time curve of an FFS type LCD, and curve ③ is the transmittance/time curve of the LCD having intersected electrodes structure but without triangular protrusion-shaped patterns structure. In addition, in the table of FIG. 7, Ton is designated as the rotating time required by the liquid crystal molecules in order to increase the transmittance from 10% to 90%. Toff is designated as the rotating time required by the liquid crystal molecules in order to decrease the transmittance from 90% to 10%. It can be seen from FIG. 7, for the LCD according to the first embodiment having intersected electrodes structure and triangular protrusion-shaped patterns structure, the Ton value is significantly less than that of the LCD having intersected electrodes structure but without triangular protrusion-shaped patterns structure, while the Toff value is close to that of the LCD having intersected electrodes structure but without triangular protrusion-shaped patterns structure. Further, contrasted with the LCD having intersected electrodes structure but without triangular protrusion-shaped patterns structure, the Ton value and Toff value of the LCD according to the first embodiment having intersected electrodes structure and triangular protrusion-shaped patterns structure are more close to those of FFS type LCD. Therefore, the LCD with triangular protrusion-shaped pattern structure is also superior to the LCD without triangular protrusion-shaped patterns structure, relating to aspects of response time.

In summary, the LCD of the first embodiment having intersected electrodes structure with triangular protrusion-shaped patterns structure is superior to the LCD having intersected electrodes structure without triangular protrusion-shaped patterns structure not only in aspects of transmittance but also in aspects of response time of the liquid crystal molecules.

In order to clearly explain the present embodiment, the advantages of the present embodiment are shown hereafter by comparison between the LCD according to the first embodiment and an another LCD. In the first embodiment, the LCD forms two triangular protrusion-shaped patterns facing each other on the first electrodes 15 of each sub-pixel area P1; and the rubbing direction of the first and second alignment films is angled to the vertex connection direction of the two triangular protrusion-shaped patterns 150 by an angle of 7 degrees. However, said another LCD forms, in each sub-pixel area. P1, two triangular protrusion-shaped patterns facing each other disposed on the first electrodes 15 and two triangular protrusion-shaped patterns facing each other disposed on the second electrodes 16; that is, there are four triangular protrusion-shaped patterns in each sub-pixel area P1. Furthermore, in said another LCD, the rubbing direction of the first and second alignment films is parallel to the vertex connection direction of the two triangular protrusion-shaped patterns disposed on the adjacent first electrodes 15, and perpendicular to the vertex connection direction of the two triangular protrusion-shaped patterns disposed on the adjacent second electrodes 16.

Figure 8A:
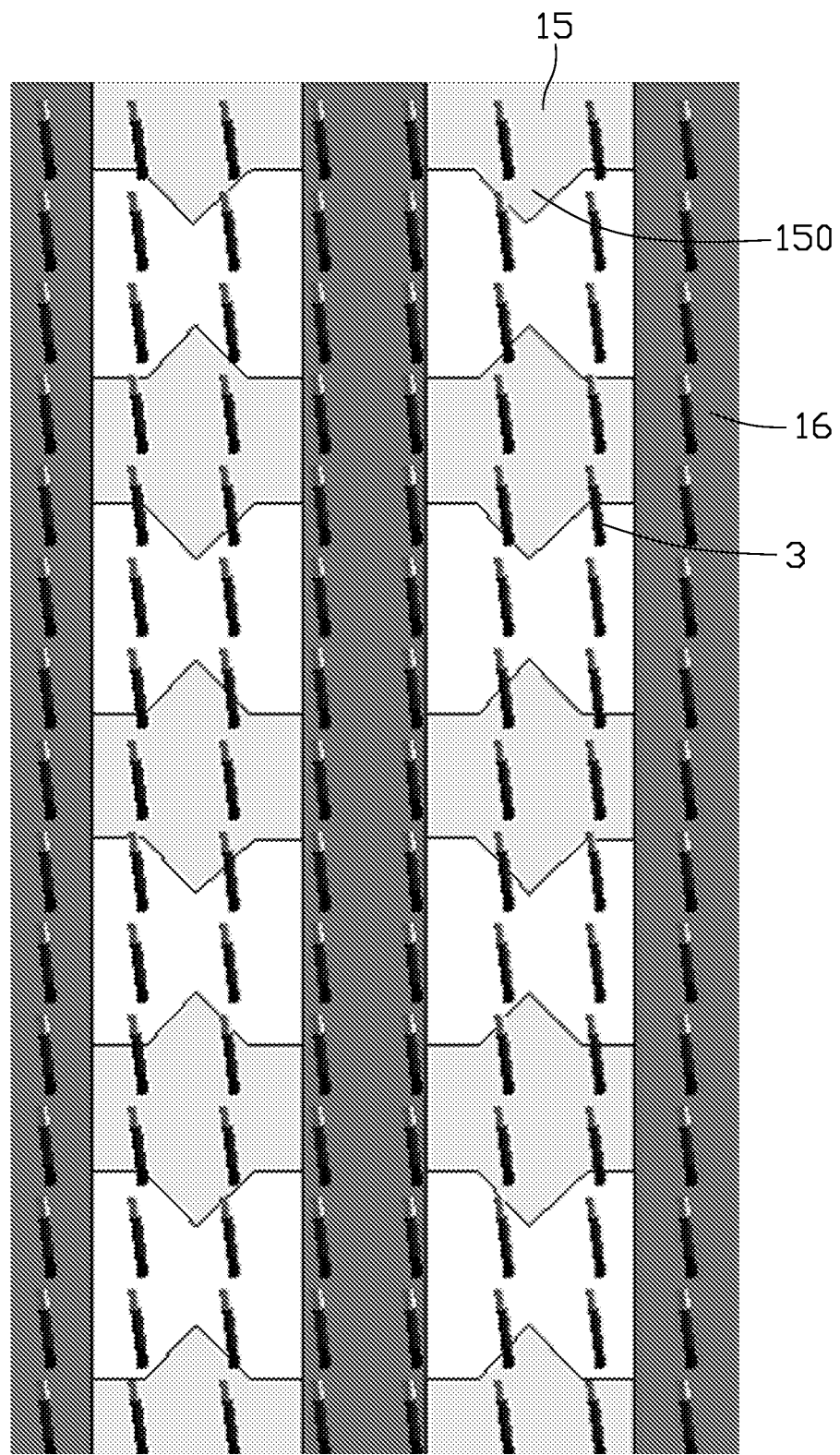
FIG. 8a is a top view for showing director of liquid crystal molecules when voltage difference between the first electrodes and the second electrodes of the LCD according to the first embodiment is 0V.
Figure 8B:
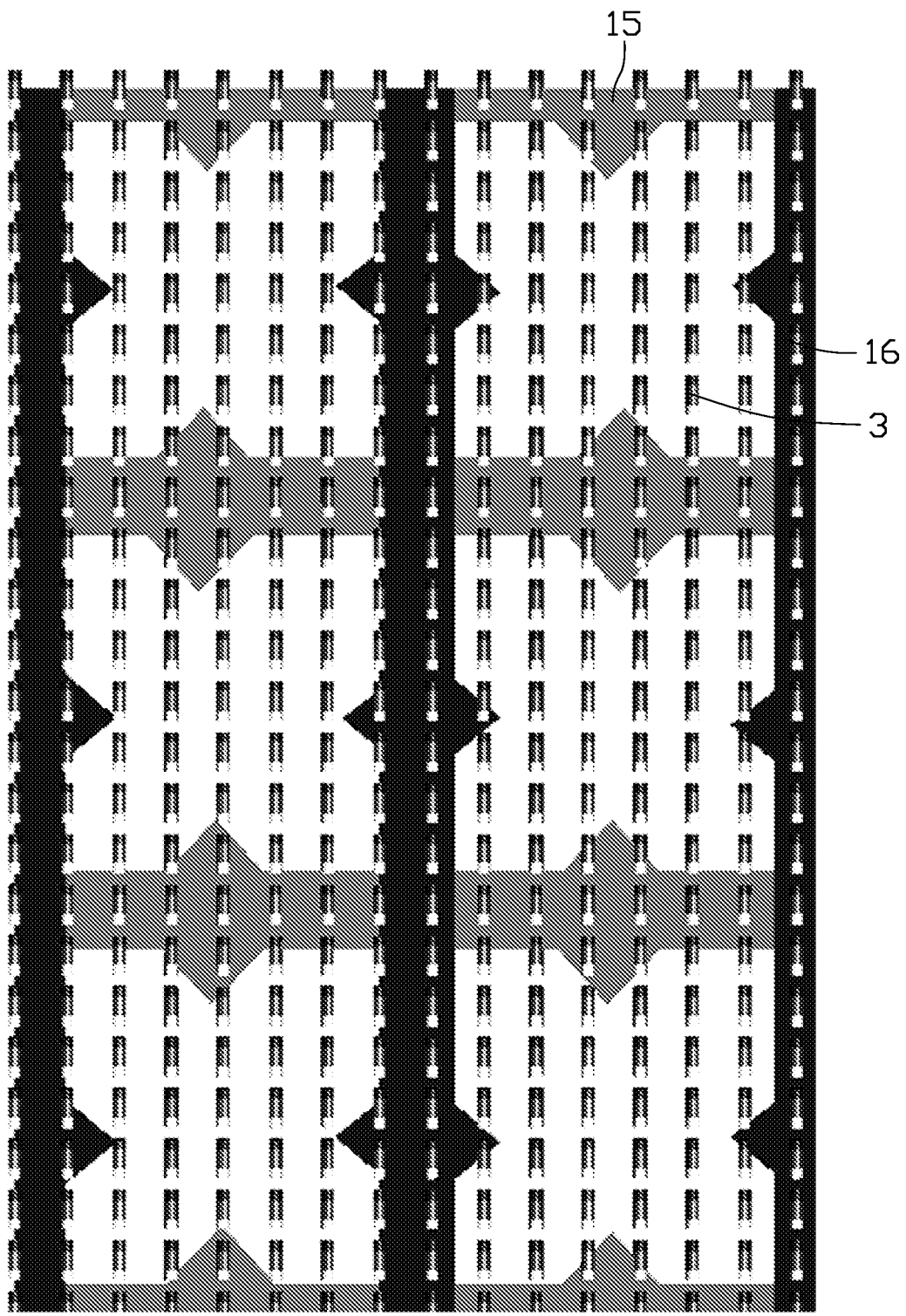
FIG. 8b is a top view for showing director of liquid crystal molecules when voltage difference between the first and second electrodes of another LCD is 0V.

FIG. 8a is a top view for showing director of the liquid crystal molecules when voltage difference between the first electrodes and the second electrodes of the LCD according to the first embodiment is 0V. FIG. 8b is a top view for showing director of the liquid crystal molecules when voltage difference between the first and second electrodes of another LCD is 0v. As shown in FIG. 8a, when there is no voltage difference between the pixel electrodes and the common electrodes of the LCD according to the first embodiment, i.e., the voltage difference between the first electrodes 15 and the second electrodes 16 of the LCD according to the first embodiment is 0V, the director of the liquid crystal molecules 3 is angled to the vertex connection direction of the two triangular protrusion-shaped patterns 150 by an angle of 7 degrees. While as shown in FIG. 8b, when there is no voltage difference between the pixel electrodes and the common electrodes of said another LCD, i.e., the voltage difference between the first electrodes 15 and the second electrodes 16 of said another LCD is 0V, the director of the liquid crystal molecules 3 is parallel to the vertex connection direction of the two triangular protrusion-shaped patterns 150 configured on the first electrodes 15 and perpendicular to the vertex connection direction of the two triangular protrusion-shaped patterns 150 configured on the second electrodes 160.

Figure 9A:
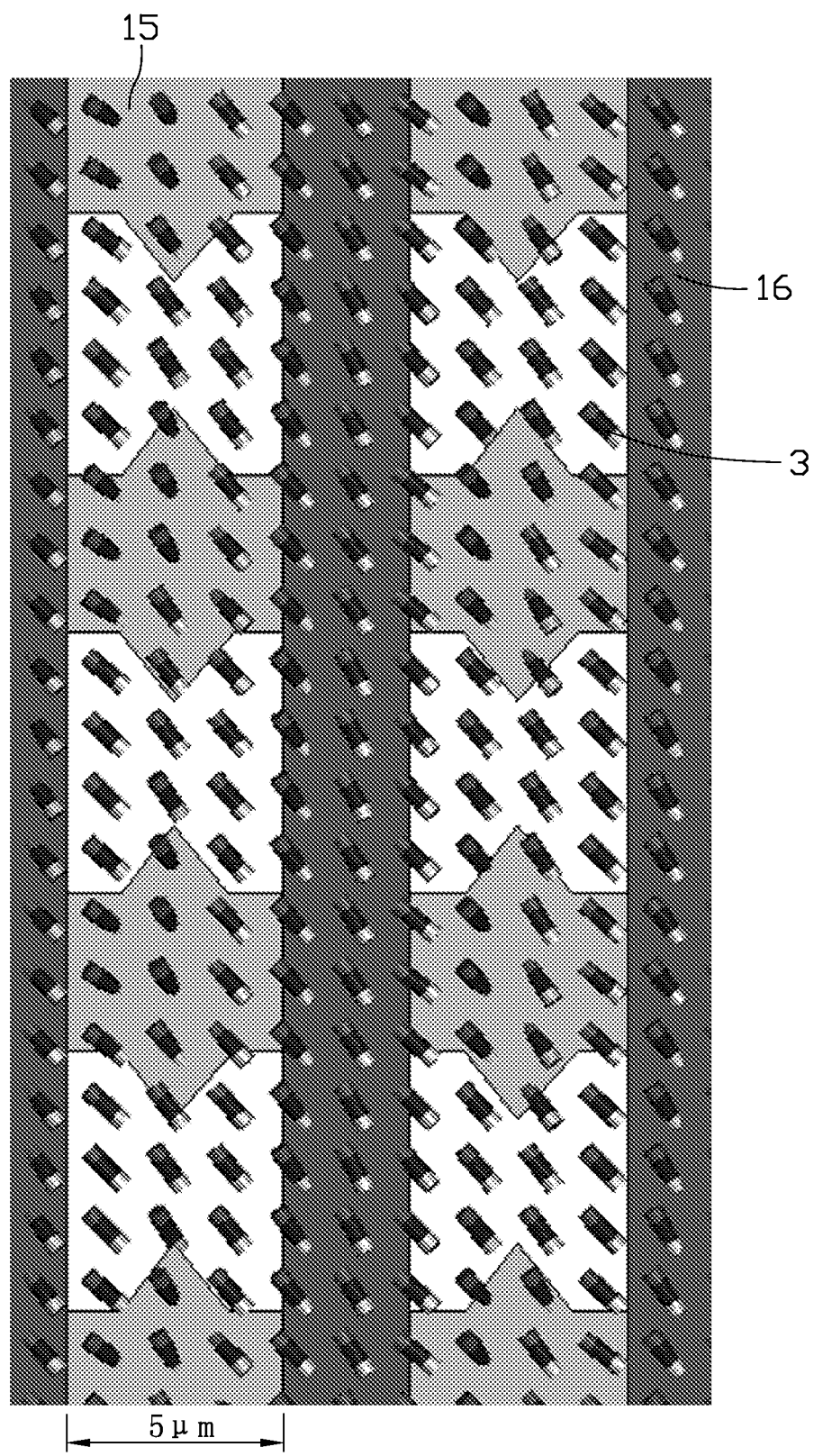
FIG. 9a is a top view for showing director of liquid crystal molecules when voltage difference between the first electrodes and the second electrodes of the LCD according to the first embodiment is 5V.
Figure 9B:
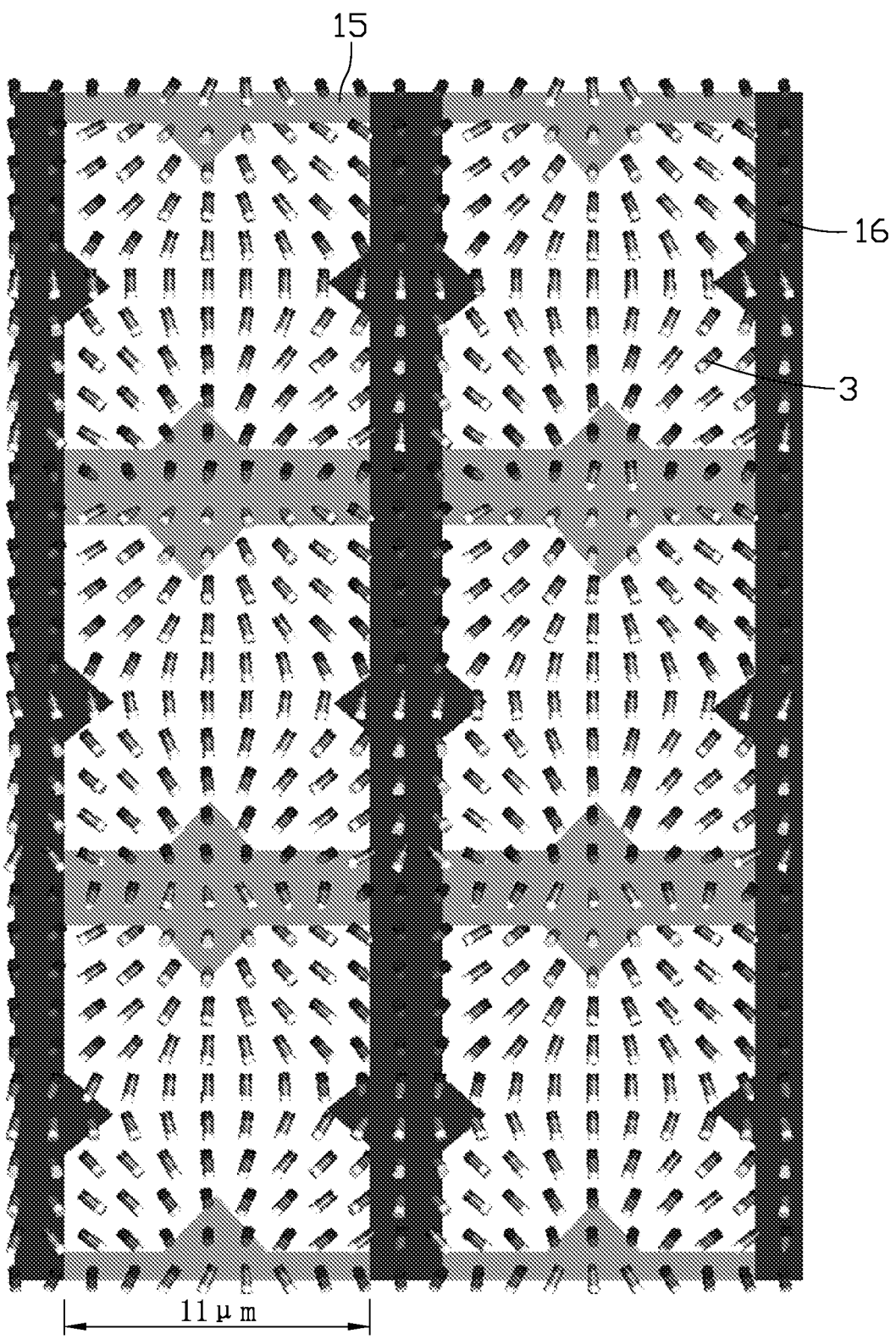
FIG. 9b is a top view for showing director of liquid crystal molecules when voltage difference between the first and second electrodes of another LCD is 5V.

FIG. 9a is a top view for showing director of the liquid crystal molecules when voltage difference between the first electrodes and the second electrodes of the LCD according to the first embodiment is 5V. FIG. 9b is a top view for showing director of the liquid crystal molecules when voltage difference between the first and second electrodes of another LCD is 5v. As shown in FIG. 9a, when the voltage difference between the pixel electrodes and the common electrodes of the LCD according to the first embodiment is 5V, i.e., the voltage difference between the first electrodes 15 and the second electrodes 16 of the LCD according to the first embodiment is 5V, the liquid crystal molecules 3 are twisted toward a same direction. While as shown in FIG. 9b, when the voltage difference between the pixel electrodes and the common electrodes of said another LCD is 5V, i.e., the voltage difference between the first electrodes 15 and the second electrodes 16 of said another LCD is 5V, the liquid crystal molecules 3 are twisted toward two symmetrical directions. In order to achieve two symmetrically twisting directions of the liquid crystal molecules 3, the intervals between the second electrodes 16 of said another LCD must be relatively large, preferably larger than 8 µm, for example, the intervals between the second electrodes 16 of said another LCD shown in FIG. 9*b* is 11 µm. However, the LCD according to the first embodiment can achieve the above-mentioned result of twisting the liquid crystal molecules 3 toward the same direction, even though the intervals between the second electrodes 16 is as small as, for example, 5 µm.

Figure 10A:
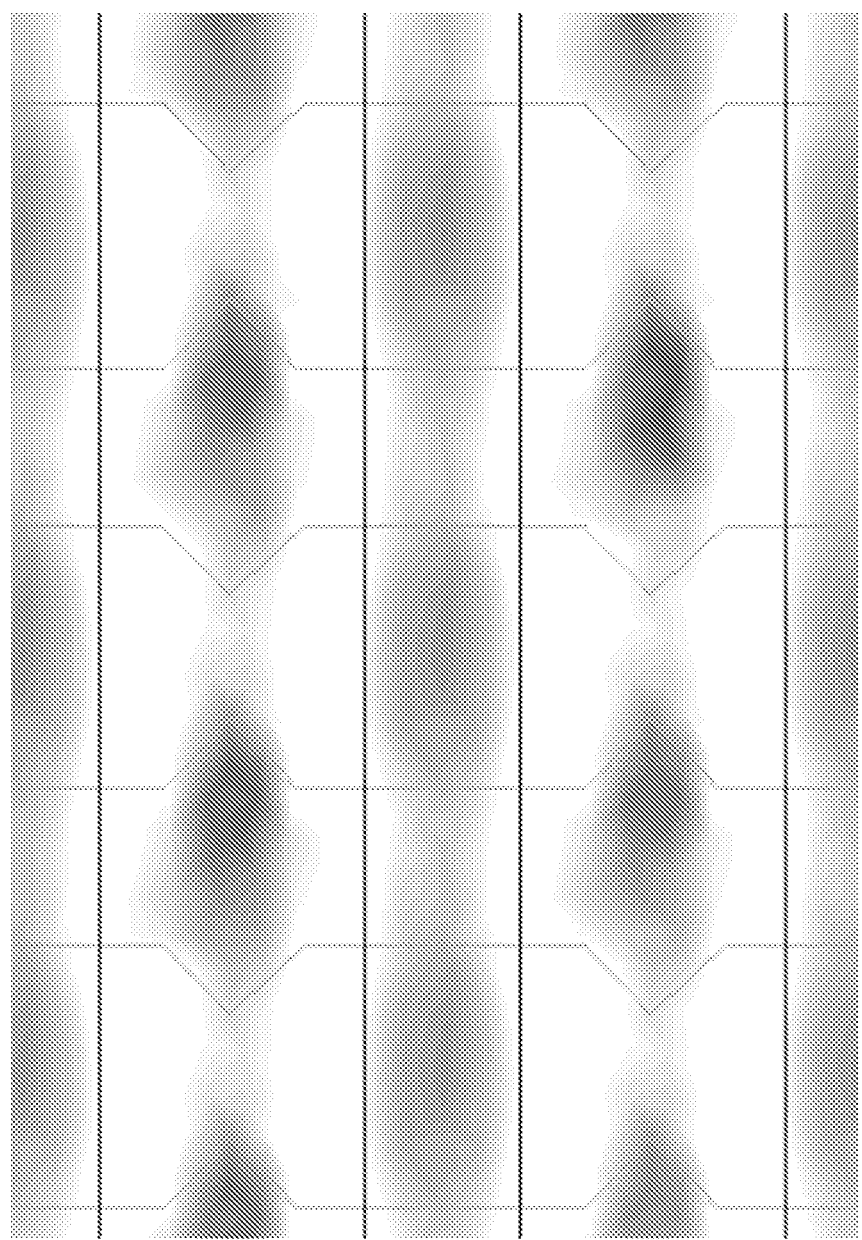
FIG. 10a is a simulated diagram for illustrating transmittance of the LCD according to the first embodiment when voltage difference between the first and second electrodes is 5V.
Figure 10B:
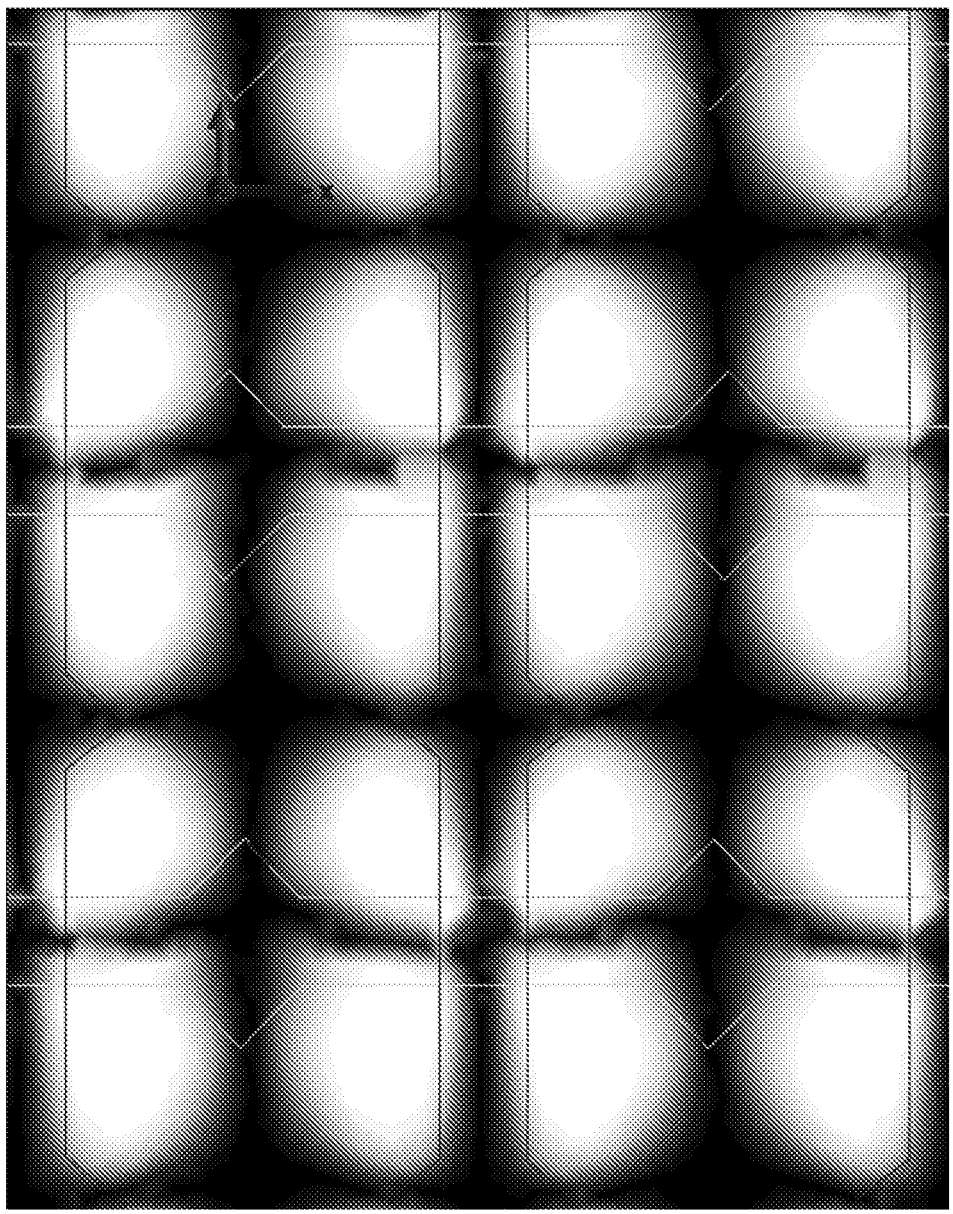
FIG. 10b is a simulated diagram for illustrating transmittance of another LCD when voltage difference between the first and second electrodes is 5V.

FIG. 10*a* is a simulated diagram for illustrating transmittance of the LCD according to the first embodiment when voltage difference between the first and second electrodes is 5V. FIG. 10*b* is a simulated diagram for illustrating transmittance of another LCD when voltage difference between the first and second electrodes is 5V. As shown in FIGS. 10*a*-10*b*, clearly, the LCD according to the first embodiment has a greater transmittance than said another LCD under the same conditions.

Figure 11:
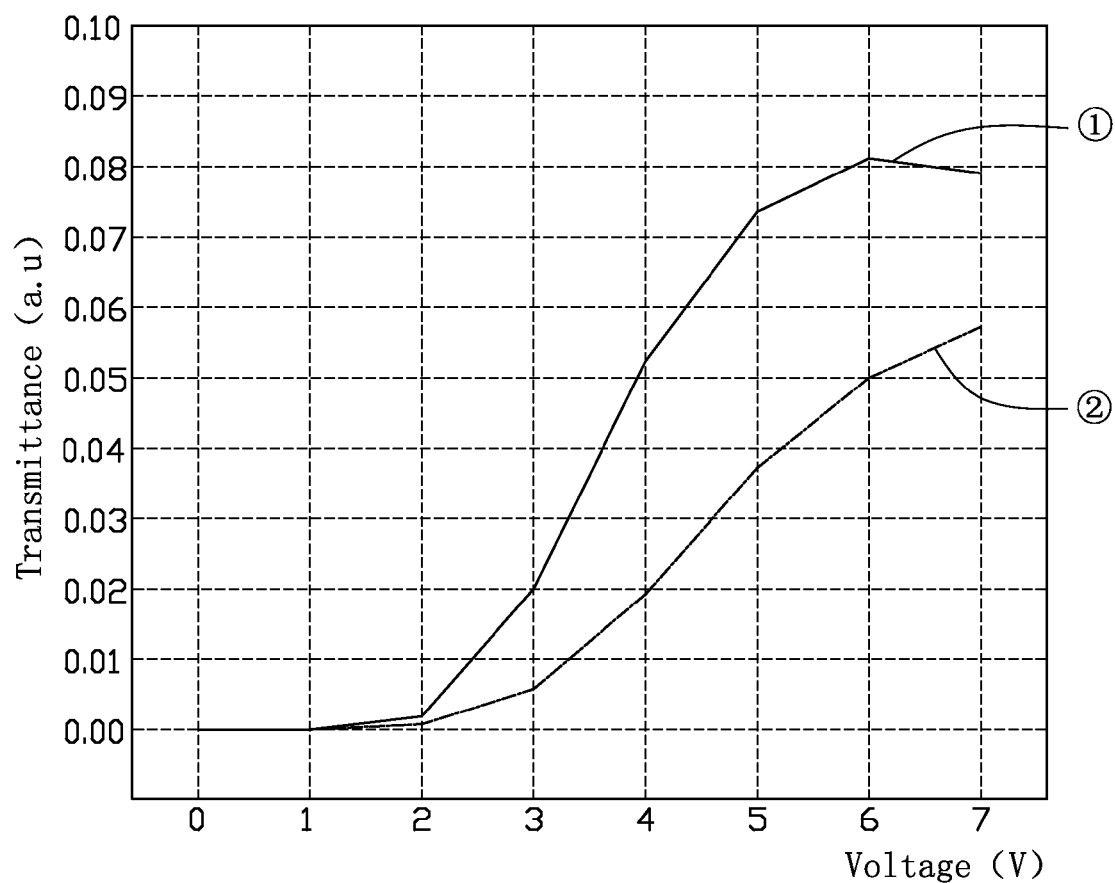
FIG. 11 is a diagram for contrasting the transmittance/time curve of the LCD of the first embodiment with that of another LCD.

FIG. 11 is a diagram for contrasting the transmittance/voltage curve of the LCD of the first embodiment with that of another LCD. Curves ① and ② in FIG. 11 are generated in the same simulation onditions. Curve ① is the transmittance/voltage curve of the LCD according to the first embodiment, and curve ② is the transmittance/voltage curve of another LCD. As shown in FIG. 11, in the same simulating area and under the condition of the same driving voltage, the transmittance of the LCD according to the first embodiment is more superior to that of said another LCD. For example, when the driving voltage is 6V, the transmittance of the LCD according to the first embodiment is 8%, but the transmittance of said another LCD is only 5%. It can be seen that the transmittance of the LCD according to the first embodiment is 1.6 times of that of said another LCD.

Figure 12A:
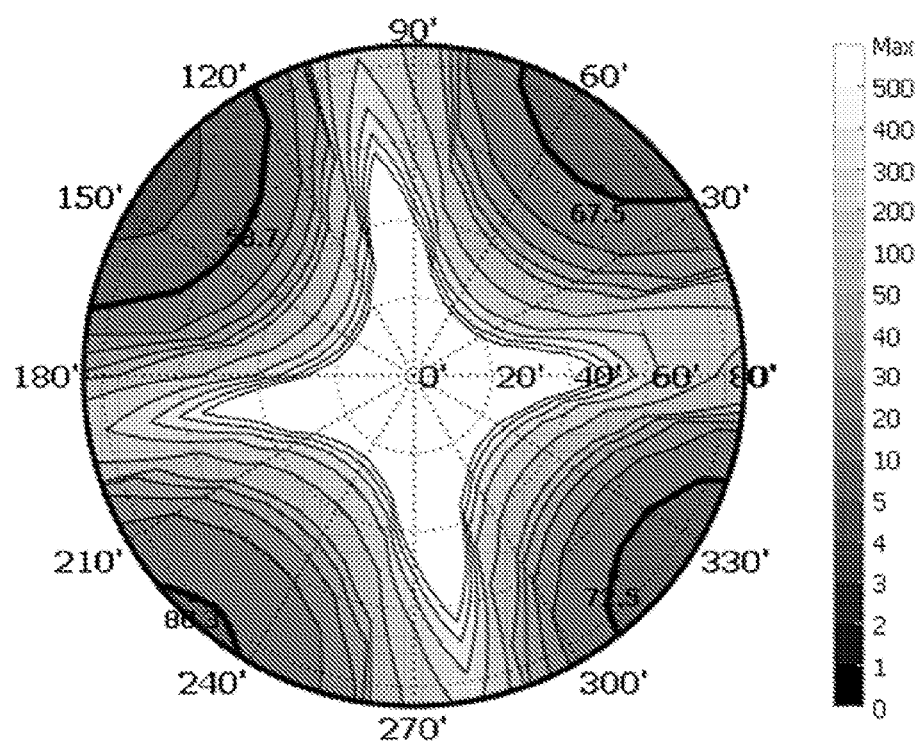
FIG. 12a is a simulated diagram for illustrating viewing angle scope of the LCD according to the first embodiment.
Figure 12B:
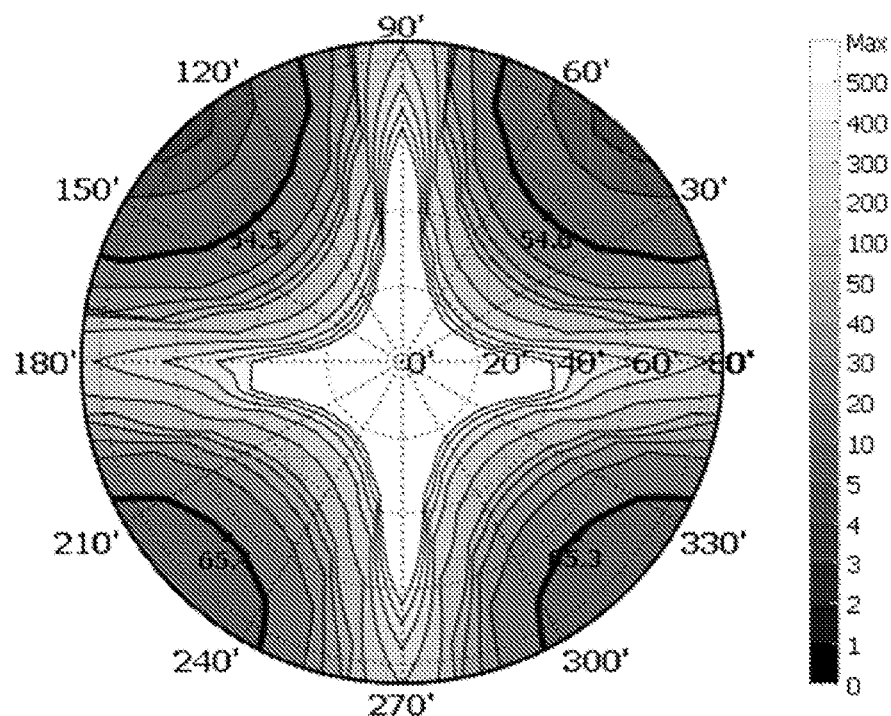
FIG. 12b is a simulated diagram for illustrating viewing angle scope of another LCD.

FIG. 12*a* and FIG. 12*b* illustrate the difference of the LCD according to the first embodiment from another LCD in viewing angle scope. FIG. 12*a* is a simulated diagram for illustrating viewing angle scope of the LCD according to the first embodiment. FIG. 12*b* is a simulated diagram for illustrating viewing angle scope of said another LCD. As shown in FIG. 12*a*, the LCD according to the first embodiment with a contrast ratio of 10:1 has marginal viewing angles of 58.7 degrees, 67.5 degrees, 80.3 degrees and 72.5 degrees, respectively. However, as shown in FIG. 12*b*, said another LCD with a contrast ratio of 10:1 has marginal viewing angles of 54.5 degrees, 54.6 degrees, 65.4 degrees and 65.3 degrees, respectively. In other words, the LCD according to the first embodiment has a higher viewing angle scope relative to said another LCD.

In addition, in order to highlight the advantages of the LCD according to the first embodiment, it would be contrasted with three additional LCDs. The LCD according to the first embodiment forms two triangular protrusion-shaped patterns 150 facing each other on the first electrodes 15 in each sub-pixel area P1, i.e., only two triangles protrusion-shaped patterns 150 exist in each sub-pixel area P1; and furthermore the rubbing direction of the first alignment film and the second alignment film is angled to the vertex connection direction of the two protrusion-shaped pattern 150 by an angle of 7 degrees. The first additional LCD forms two triangular protrusion-shaped patterns 150 facing each other on the first electrodes 15 in each sub-pixel area P1, i.e., only two triangles protrusion-shaped patterns 150 exist in each sub-pixel area P1; but the rubbing direction of the first alignment film and the second alignment film is parallel to the vertex connection direction of the two protrusion-shaped patterns 150. The second additional LCD in each sub-pixel area P1 forms not only two triangular protrusion-shaped patterns 150 facing each other on the first electrodes 15, but also two triangular protrusion-shaped patterns 150 facing each other on the second electrodes 16, i.e., four triangles protrusion-shaped patterns 150 exist in each sub-pixel area P1, and the rubbing direction of the first alignment film and the second alignment film is parallel to the vertex connection direction of the two protrusion-shaped patterns 150 disposed on the first electrode 15. The third additional LCD in each sub-pixel area P1 forms not only two triangular protrusion-shaped patterns 150 facing each other on the first electrodes 15, but also two triangular protrusion-shaped patterns 150 facing each other on the second electrodes 16, i.e., four triangular protrusion-shaped patterns 150 exist in each sub-pixel area P1 and the rubbing direction of the first alignment film and the second alignment film is angled to the vertex connection direction of the two protrusion-shaped pattern 150 disposed on the first electrodes 15 by an angle of 7 degrees.

Figure 13:
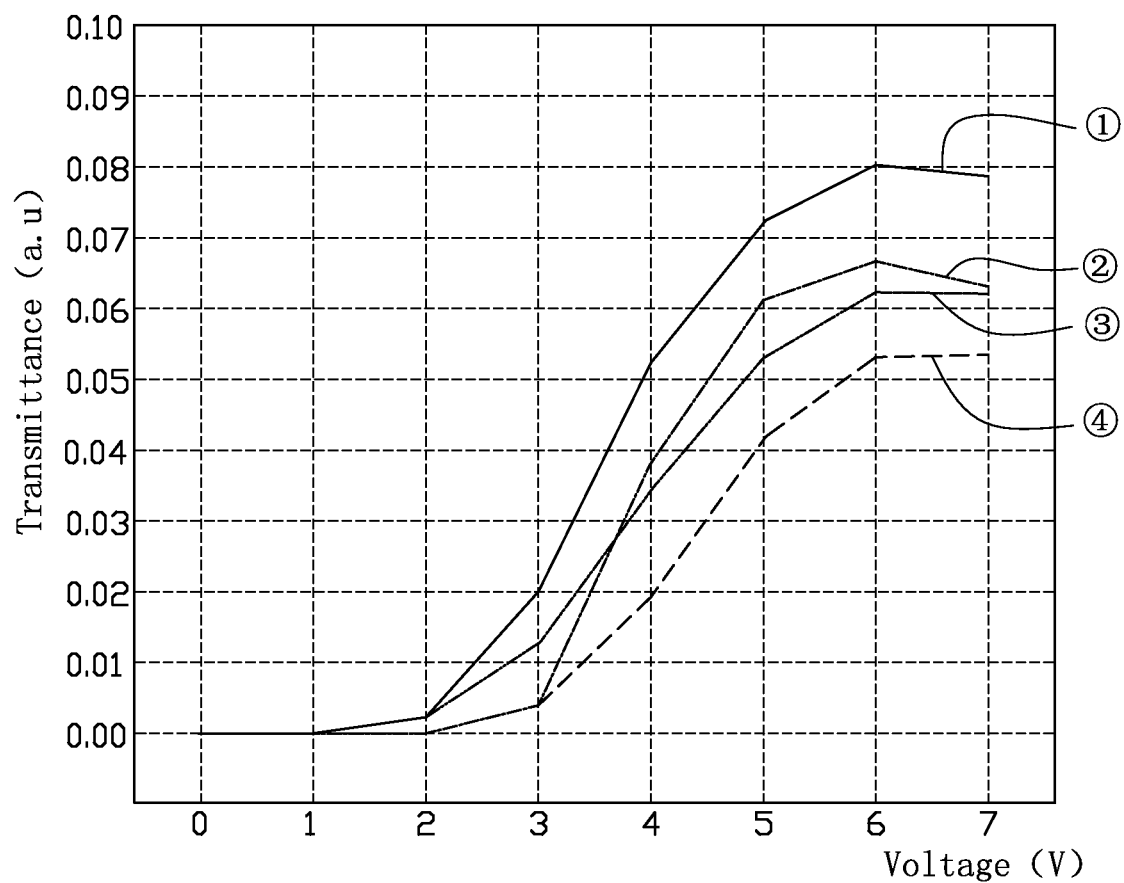
FIG. 13 is a diagram for contrasting the transmittance/voltage curve of the LCD of the first embodiment with those of three additional LCDs.

FIG. 13 is a diagram for contrasting the transmittance/voltage curve of the LCD of the first embodiment with those of three additional LCDs. The curves ①, ②, ③ and ④ in FIG. 13 are generated under the same simulation conditions. Curve ① is the transmittance/voltage curve of the LCD according to the first embodiment, curve ② is the transmittance/voltage curve of the first additional LCD, the curve ③ is the transmittance/voltage curve of the second additional LCD, and curve ④ is the transmittance/voltage curve of the third additional LCD. It can be known from curves ① and ② in FIG. 13, under the condition of the same driving voltage, the LCD according to the first embodiment is clearly superior to the first additional LCD, in aspects of transmittance. It can be easily known from curves ③ and ④ in FIG. 13, the second additional LCD is clearly superior to the third additional LCD, in aspects of transmittance. It can be also clearly seen from the four curves in FIG. 13, regardless whether there is an angle or not between the rubbing direction of the first and second films and the vertex connection direction of the protrusion-shaped patterns 150 disposed on the first electrodes 15, the LCD only with two protrusion-shaped patterns in each sub-pixel area P1 is superior in aspects of transmittance to the LCDs with four protrusion-shaped patterns in each sub-pixel area P1. Furthermore, it can be seen from FIG. 13, in the same simulating area and under the condition of the same driving voltage, the LCD according to the first embodiment has the highest transmittance compared to the three additional LCDs.

Figure 14:
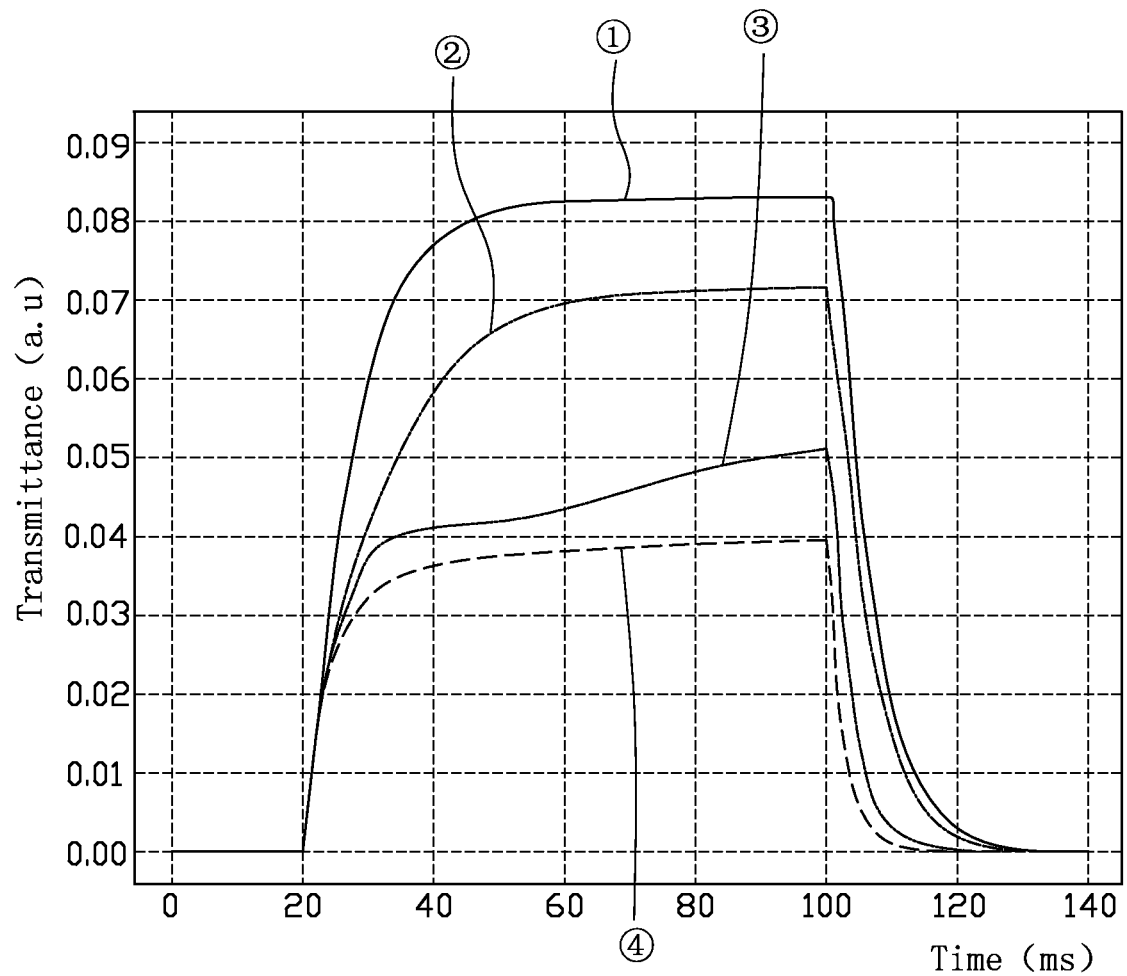
FIG. 14 is a diagram for contrasting the transmittance/time curve of the LCD of the first embodiment with those of three additional LCDs.

FIG. 14 is a diagram for contrasting the transmittance/time curve of the LCD of the first embodiment with those of three additional LCDs. The curves ①, ②, ③ and ④ in FIG. 14 are generated under the same simulation conditions. Curve ① is the transmittance/time curve of the LCD according to the first embodiment, curve ② is the transmittance/time curve of the first additional LCD, the curve ③ is the transmittance/time curve of the second additional LCD, and curve ④ is the transmittance/time curve of the third additional LCD. It can be known from curves ① and ② in FIG. 14, the LCD according to the first embodiment is clearly superior to the first additional LCD, in aspects of transmittance and response time. It can be known from curves ③ and ④ in FIG. 14, the second additional LCD is clearly superior to the third additional LCD, in aspects of transmittance and response time. It can be also clearly seen from the four curves in FIG. 14, regardless whether there is an angle or not between the rubbing direction of the first and second films and the vertex connection direction of the protrusion-shaped patterns disposed on the first electrodes, the LCD only with two protrusion-shaped patterns in each sub-pixel area P1 is superior in aspects of transmittance and response time to the LCDs with four protrusion-shaped patterns in each sub-pixel area P1. It can also be seen from FIG. 14, in the same simulating condition, the LCD according to the first embodiment has the quickest response time and the highest transmittance compared to the three additional LCDs.

Please refer to FIGS. 3-4 again, a width L1 of the first electrodes 15 and a width L2 of the second electrodes 16 are within a range of 2-5 μm. Since disclination lines exist right above the first electrodes 15 and the second electrodes 16, the thinner the width L1 of the first electrodes 15 and the width L2 of the second electrodes 16 are, the better the LCD is. But considering the actual process capability, preferably, the width L1 of the first electrodes 15 and the width L2 of the second electrodes 16 are supposed to be 2-5 μm.

In addition, in each sub-pixel area P1, the first electrodes 15 are located below the second electrodes 16, therefore, the gap width L3 between two adjacent second electrodes 16 located in an upper layer is in a range of 3-8 μm, the gap width L4 between two adjacent first electrodes 15 located in a lower layer is in a range of 0-6 μm, and the distance L5 between the two triangular protrusion-shaped patterns 150 disposed on the first electrodes 15 is in a range of 0-6 μm.

Figure 15:
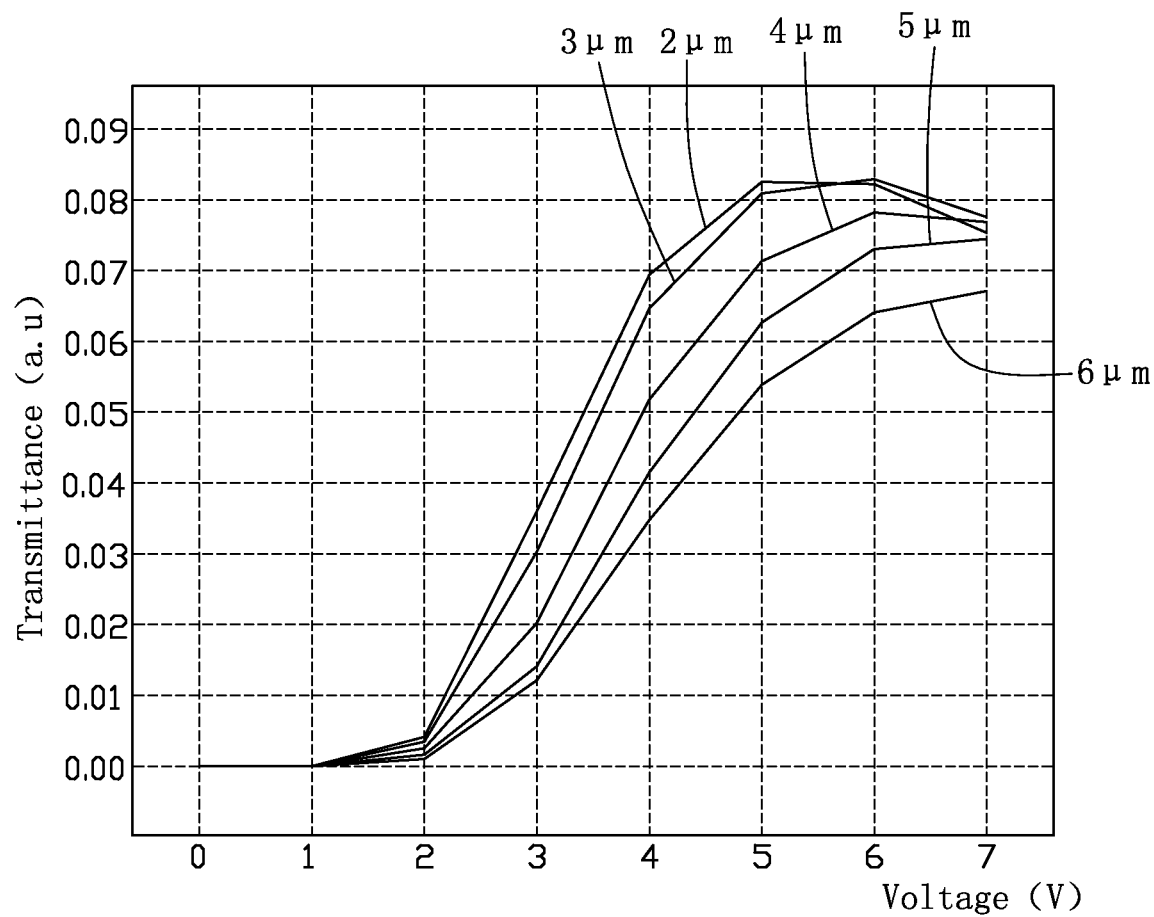
FIG. 15 is a diagram for contrasting the transmittance/voltage curves of the LCD according to the first embodiment when the LCD according to the first embodiment has different gap widths between two adjacent first electrodes.

FIG. 15 is a diagram for contrasting the transmittance/voltage curves of the LCD according to the first embodiment when the LCD according to the first embodiment has different gap widths L4 between two adjacent first electrodes 15. As shown in FIG. 15, under the condition that the voltage difference between the first electrodes 15 and the second electrodes 16 is 5V, the transmittance of the LCD is 8.5% when the gap width L4 between the two adjacent first electrodes 15 is 2 μm, the transmittance of the LCD is 8.3% when the gap width L4 between the two adjacent first electrodes 15 is 3 μm, the transmittance of the LCD is 7.3% when the gap width L4 between the two adjacent first electrodes 15 is 4 μm, the transmittance of the LCD is 6.5% when the gap width L4 between the two adjacent first electrodes 15 is 5 μm, and the transmittance of the LCD is 5.5% when the gap width between the two adjacent first electrodes 15 is 6 μm. When the gap width L4 is greater than 6 μm, the transmittance significantly drops. Therefore, the gap width L4 is preferably less than 6 μm, and proposed to be within the range of 0-6 μm in the present embodiment.

Figure 16:
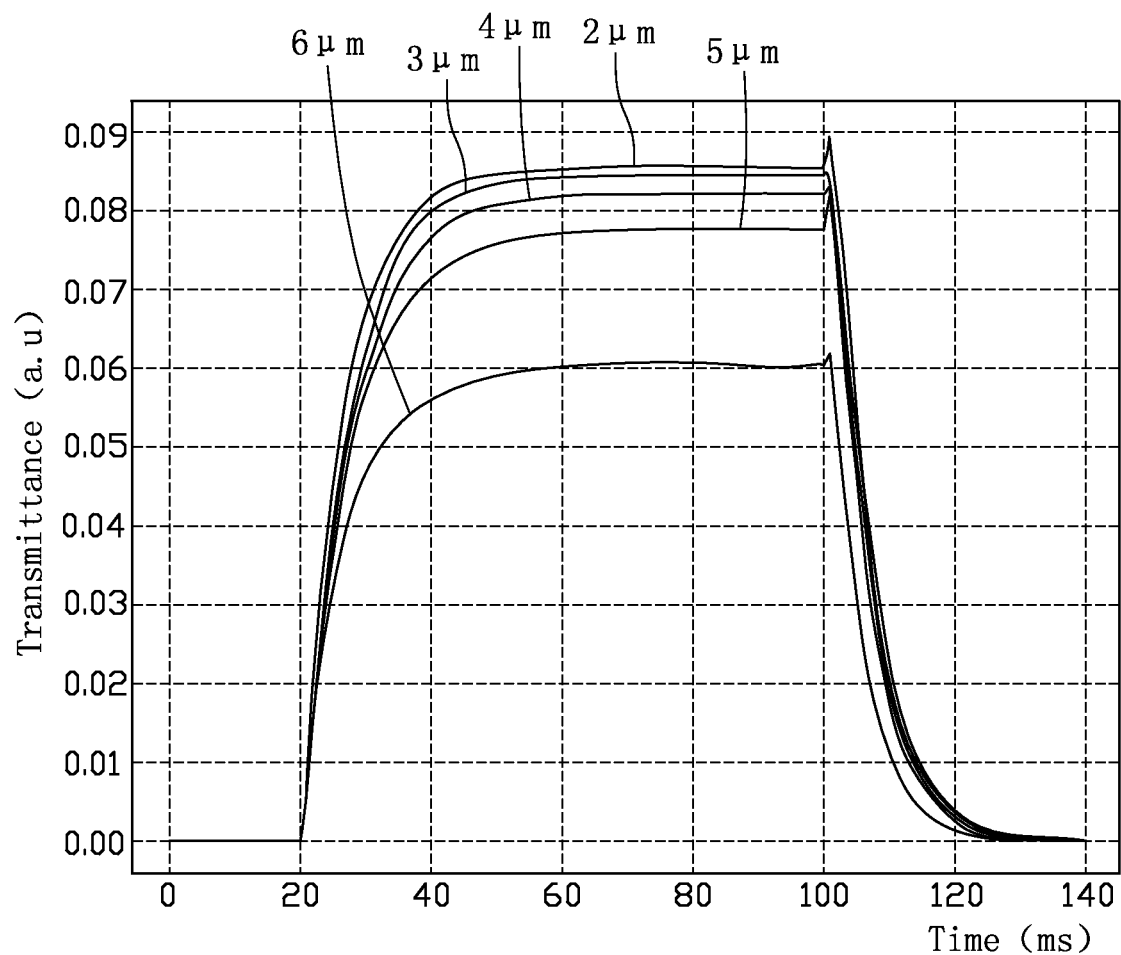
FIG. 16 is a diagram for contrasting the transmittance/time curves of the LCD according to the first embodiment when the LCD according to the first embodiment has different gap widths between two adjacent first electrodes.

FIG. 16 is a diagram for contrasting the transmittance/time curves of the LCD according to the first embodiment when the LCD according to the first embodiment has different gap widths L4 between two adjacent first electrodes 15. As shown in FIG. 16, when the gap widths L4 between the two adjacent first electrodes 15 are 2 μm, 3 μm, 5 μm and 6 μm, respectively, the response times of the LCD according to the first embodiment in turn are 27.87 ms, 30.58 ms, 29.76 ms, 29.17 ms and 39.82 ms correspondingly. When the gap width L4 is greater than 6 μm, the response time is significantly increased. Therefore, the gap width L4 is preferably less than 6 μm, and proposed to be within the range of 0-6 μm in the present embodiment.

Figure 17:
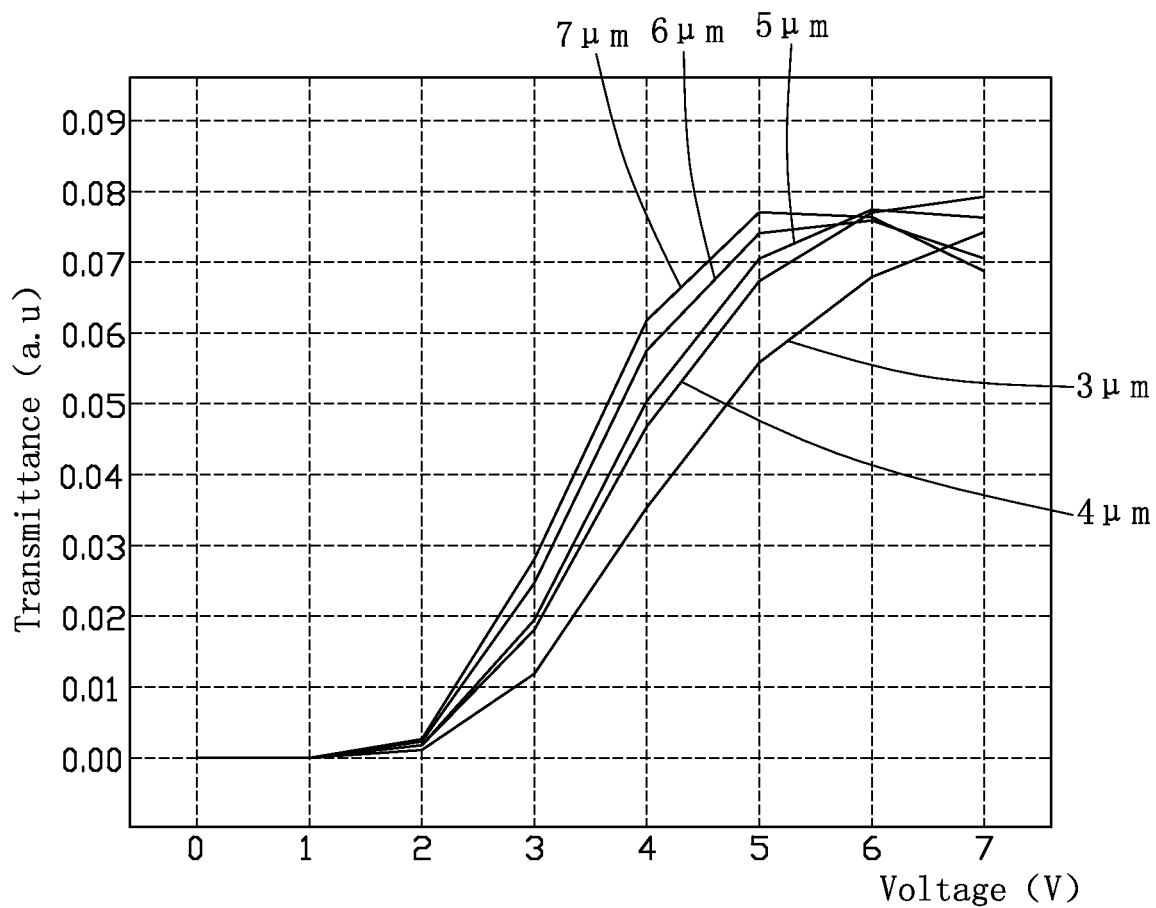
FIG. 17 is a diagram for contrasting the transmittance/voltage curves of the LCD according to the first embodiment when the LCD according to the first embodiment has different gap widths between two adjacent second electrodes.

FIG. 17 is a diagram for contrasting the transmittance/voltage curves of the LCD according to the first embodiment when the LCD according to the first embodiment has different gap widths L3 between two adjacent second electrodes 16. As shown in FIG. 17, under the condition that the voltage difference between the first electrodes 15 and the second electrodes 16 is 5V, when the gap width L3 between the two adjacent second electrodes 16 are 3 μm, 4 μm, 5 μm, 6 μm and 7 μm, respectively, the transmittance of the LCD in turn are 5.3%, 7.0%, 7.3%, 7.7% and 8.0% correspondingly. When the gap width L3 is less than 4 μm, the transmittance significantly drops. Therefore, the gap width L3 is preferably greater than 4 μm. In the present embodiment, the gap width L3 is proposed to be within the range of 3-8 μm, and particularly within the range of 4-7 μm.

Figure 18:
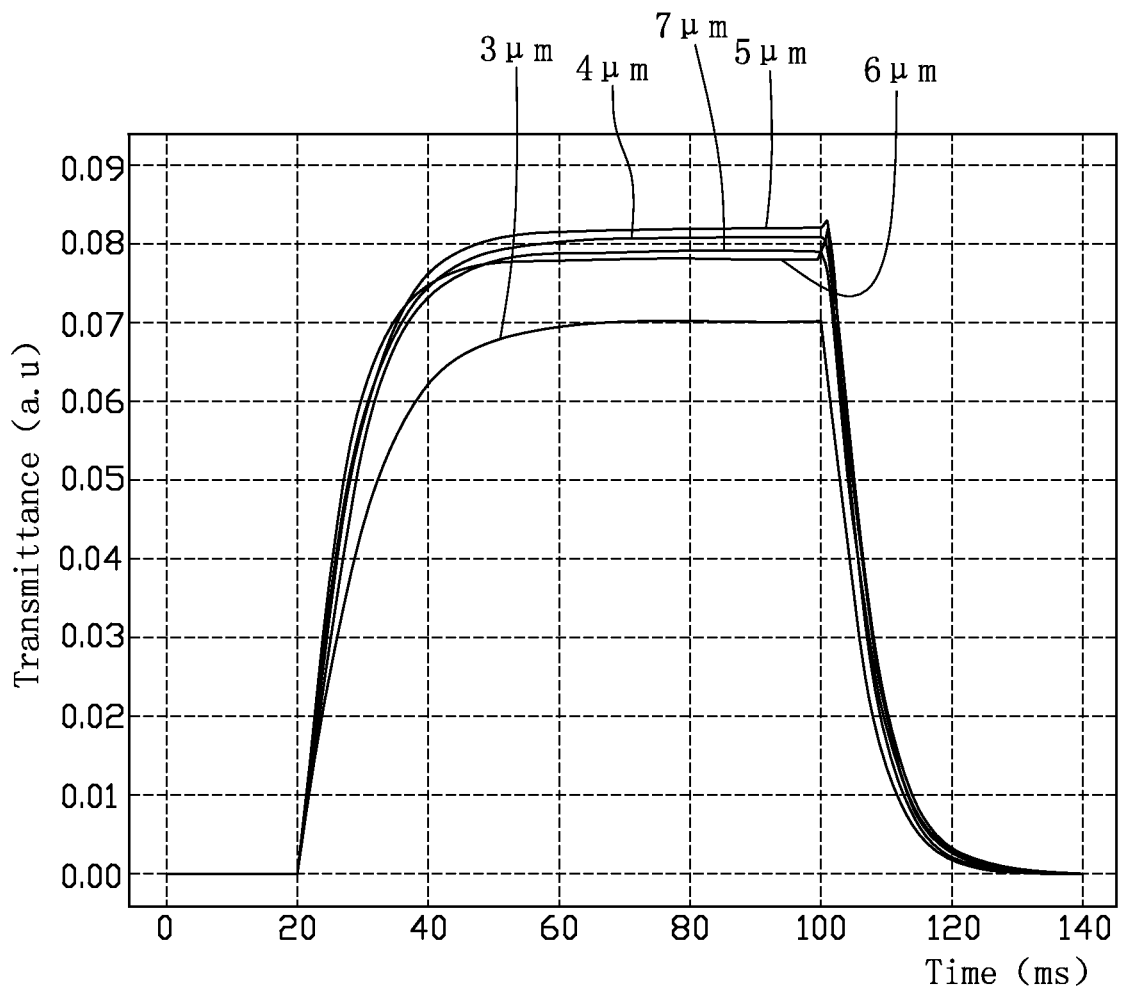
FIG. 18 is a diagram for contrasting the transmittance/time curves of the LCD according to the first embodiment when the LCD according to the first embodiment has different gap widths between two adjacent second electrodes.

FIG. 18 is a diagram for contrasting the transmittance/time curves of the LCD according to the first embodiment when the LCD according to the first embodiment has different gap widths L3 between two adjacent second electrodes 16. As shown in FIG. 18, when the gap widths L3 between the two adjacent second electrodes 16 are 3 μm, 4 μm, 5 μm, 6 μm and 7 μm, respectively, the response times of the LCD according to the first embodiment in turn are 32.48 ms, 30.66 ms, 29.85 ms, 30.90 ms and 29.10 ms correspondingly. When the gap width L3 is less than 4 μm, the response time is significantly increased. Therefore, the gap width L3 is preferably greater than 4 μm. In the present embodiment, the gap width L3 is proposed to be within the range of 3-8 μm, and particularly within the range of 4-7 μm.

Figure 19:
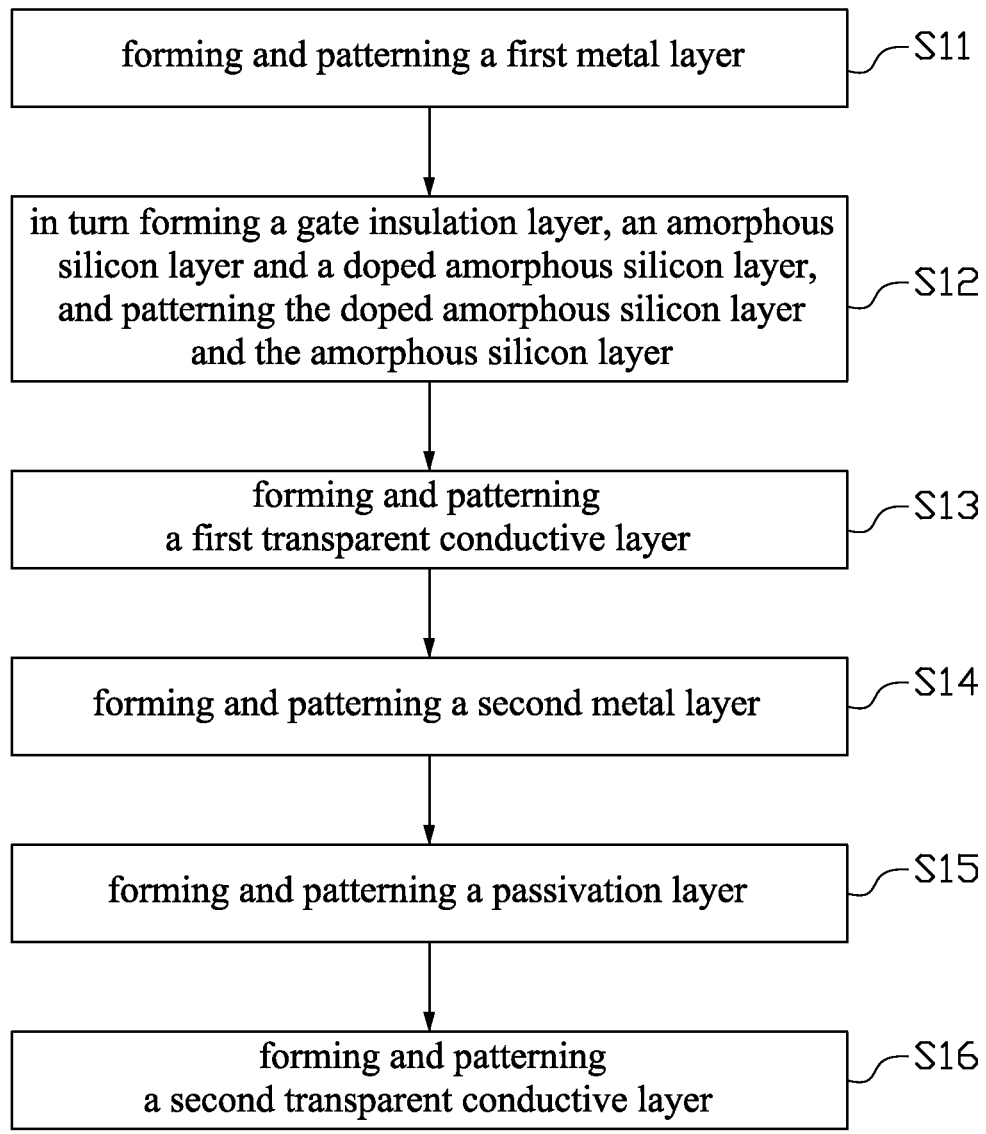
FIG. 19 is a flow chart of a method for manufacturing the first substrate of the LCD of the first embodiment as shown in FIG. 3.
Figure 20:
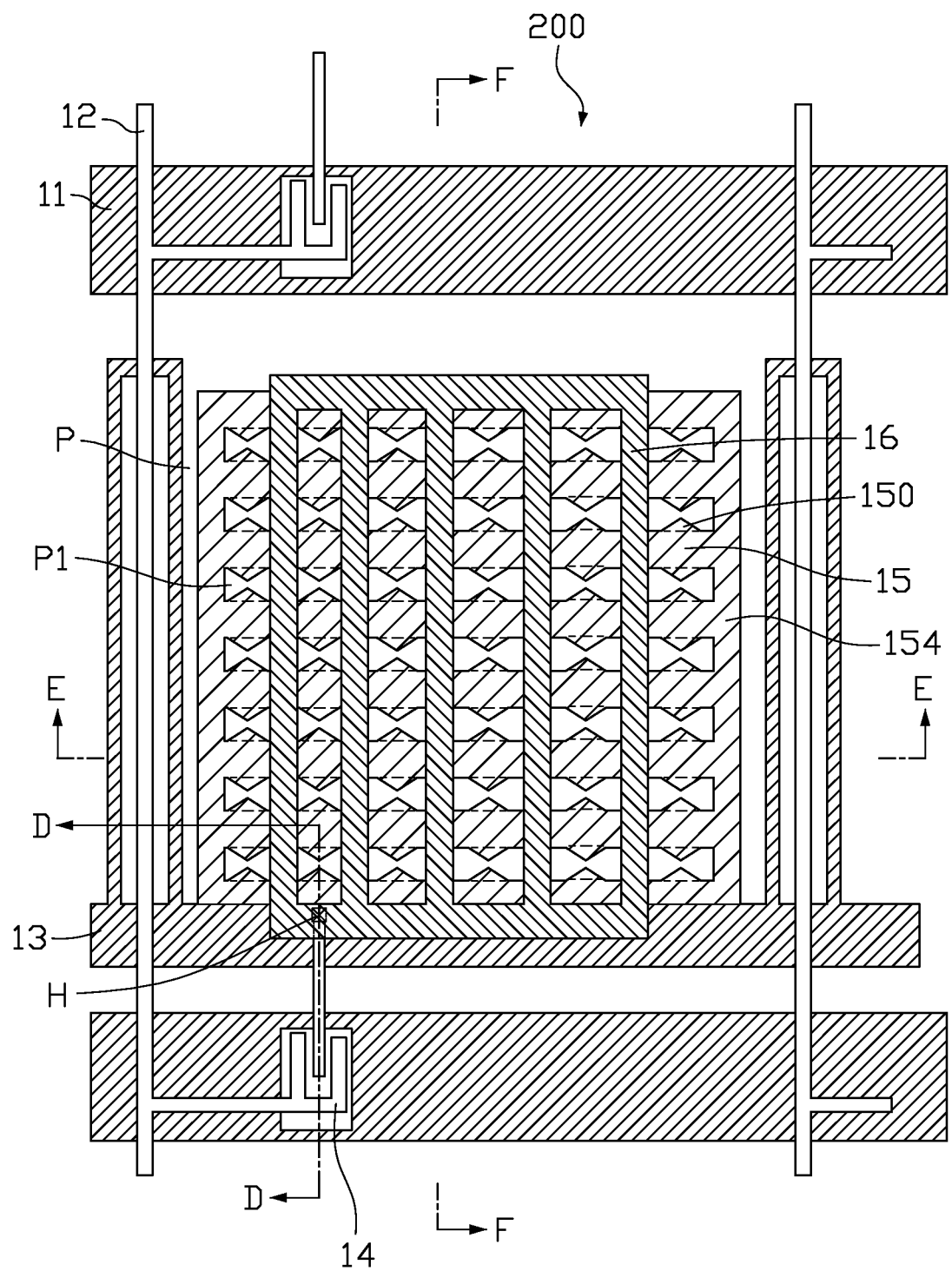
FIG. 20 is a planar view of a first substrate of an LCD according to a second embodiment.
Figure 21A:
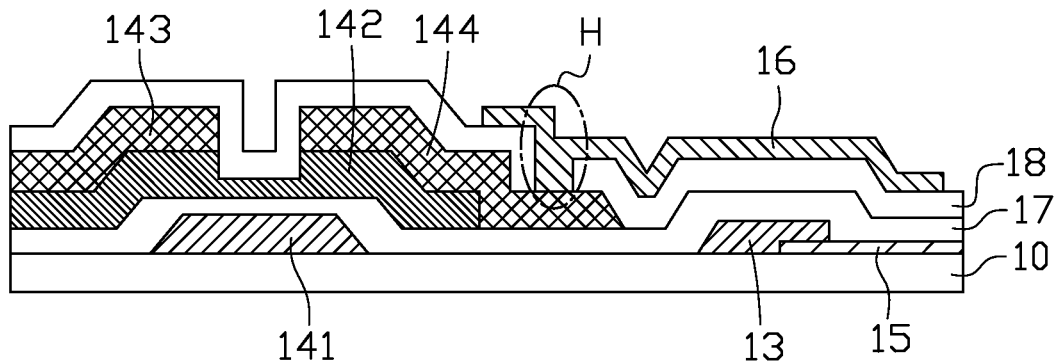
FIG. 21a is a cross-sectional view of FIG. 20 taken along the D-D line.
Figure 21B:
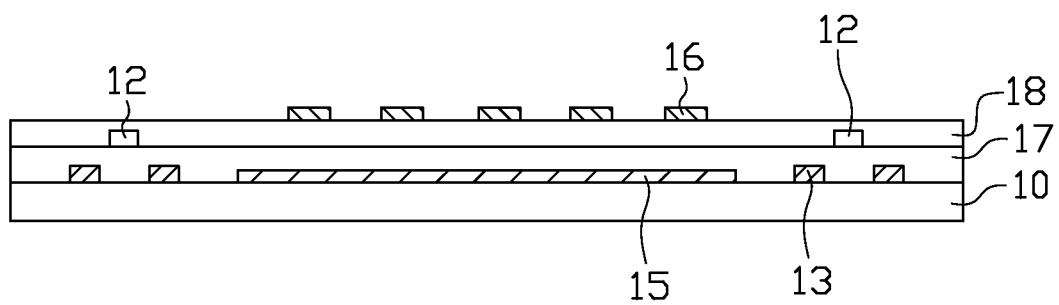
FIG. 21b is a cross-sectional view of FIG. 20 taken along the E-E line.
Figure 21C:
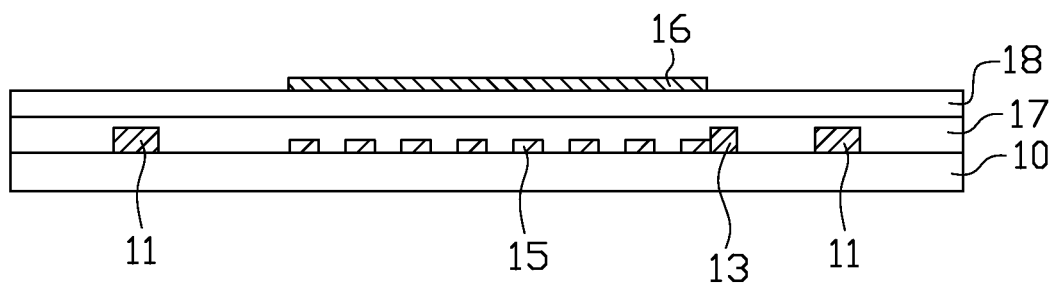
FIG. 21c is a cross-sectional view of FIG. 20 taken along the F-F line.

The first substrate 100 of the first embodiment can be manufactured by the following six mask processes. FIG. 19 is a flow chart of manufacturing the first substrate 100 of the LCD of the first embodiment. The manufacturing process of the first substrate 100 according to the first embodiment will be described in detail hereafter, referring to FIG. 19, FIG. 3 and FIGS. 5a-5c.

Referring to FIG. 19, FIG. 3 and FIGS. 5a-5c, in step S11, a first metal layer is formed and patterned by a first mask process.

Specifically, the first metal layer and a photo-resist layer are formed in turn on the transparent substrate 10, the first photo-resist layer is exposed and developed using a first mask pattern to form a first photo-resist layer pattern; and then the first metal layer is etched to be patterned using the first photo-resist layer pattern as a mask, in order to form the scanning lines 11 and the gate electrodes 141 of the thin film transistors 14; and then the first photo-resist layer is removed.

In step S12, a gate insulation layer 17, an amorphous silicon layer and a doped amorphous silicon layer are formed in turn and the doped amorphous silicon layer and the amorphous silicon layer are patterned by a second mask process.

Specifically, the gate insulation layer 17, the amorphous silicon layer, the doped amorphous silicon layer and a second photo-resist layer are formed in turn on the transparent substrate 10 with the patterned first metal layer, and the second photo-resist layer is exposed and developed using a second mask pattern to form a second photo-resist layer pattern; and then the doped amorphous silicon layer and the amorphous silicon layer are etched to be patterned using the second photo-resist layer pattern as a mask, in order to form a semiconductor layer 142 of the thin film transistor 14; and then the second photo-resist layer is removed.

In step S13, a first transparent conductive layer is formed and the first transparent conductive layer is patterned, by a third mask process.

Specifically, a first transparent conductive layer and a third photo-resist layer are formed in turn on the transparent substrate 10 with the second mask pattern, and the third photo-resist layer is exposed and developed using a third mask pattern to form a third photo-resist layer pattern; and then the first transparent conductive layer is etched to be patterned using the third photo-resist layer pattern as a mask, in order to form multiple strips of pixel electrodes, i.e., the first electrodes 15 which are electrically connected to each other, and form triangular protrusion-shaped patterns 150 which are configured on the first electrodes 15 where the first electrodes 15 and the subsequently formed common electrodes i.e., the second electrodes 16 are not overlapped; and then the third photo-resist layer is removed.

In step S14, a second metal layer is formed and patterned by a fourth mask process.

Specifically, a second metal layer and a fourth photo-resist layer are formed in turn on the transparent substrate 10 with the third mask pattern, and the fourth photo-resist layer is exposed and developed using a fourth mask pattern to form a fourth photo-resist layer pattern; and the second metal layer is etched to be patterned using the fourth photo-resist layer pattern as a mask, in order to form the data lines 12, the source electrodes 143 and drain electrodes 144 of the thin film transistors 14, wherein the drain electrodes 144 of the thin film transistors 14 are directly electrically connected to the pixel electrodes 15; and then the fourth photo-resist layer is removed.

In step S15, a passivation layer 18 is formed and patterned by a fifth mask process.

Specifically, the passivation layer 18 and a fifth photo-resist layer are formed in turn on the transparent substrate 10 with the fourth mask pattern, and the fifth photo-resist layer is exposed and developed using a fifth mask pattern to form a fifth photo-resist layer pattern; and then the passivation layer 18 and the gate insulation layer 17 below the passivation layer 18 are etched to be patterned using the fifth photo-resist layer pattern as a mask, in order to form a plurality of through holes (not shown) for connecting across a plurality of circuits; and then the fifth photo-resist layer is removed.

In step S16, a second transparent conductive layer is formed and patterned by a sixth mask process.

Specifically, the second transparent conductive layer and sixth photo-resist layer are formed in turn on the transparent substrate 10 with the fifth mask pattern, and the sixth photo-resist layer is exposed and developed using a sixth mask pattern to form a sixth photo-resist layer pattern; and then the second transparent conductive layer is etched to be patterned using the sixth photo-resist layer pattern as a mask so as to form multiple strips of common electrodes 16 electrically connected with each other; and then the sixth photo-resist layer is removed.

After completing the above steps S11-S16, the first substrate 100 according to the first embodiment is formed.

Second Embodiment

FIG. 20 and FIGS. 21a-21c illustrate a first substrate 200 of an LCD according to a second embodiment. Also for purpose of clarity, FIG. 20 only shows one pixel area P of the first substrate 200. The first substrate 200 according to the second embodiment is similar to the first substrate 100 according to the first embodiment; however it is hereafter to mainly explain the difference of the first substrate 200 according to the second embodiment from the first substrate 100 according to the first embodiment. The same features of the first substrates 100, 200 are omitted here and can make a reference to the description of the first substrate 100. As shown in FIG. 20 and FIGS. 21a-21c, in the first substrate 200 according to the second embodiment, the first electrodes 15 are common electrodes and the second electrodes 16 are pixel electrodes, and the triangular protrusion-shaped patterns 150 are disposed on the common electrodes. Another difference of the first substrate 200 from the first substrate 100 is that in the first substrate 200 according to the second embodiment, the common electrodes are disposed at a lower layer and the pixel electrodes are disposed at an upper layer, that is, the pixel electrodes are disposed above the common electrodes, and an insulating layer sandwiched between the pixel electrodes and the common electrodes comprises the gate insulation layer 17 and the passivation layer 18.

Figure 22:
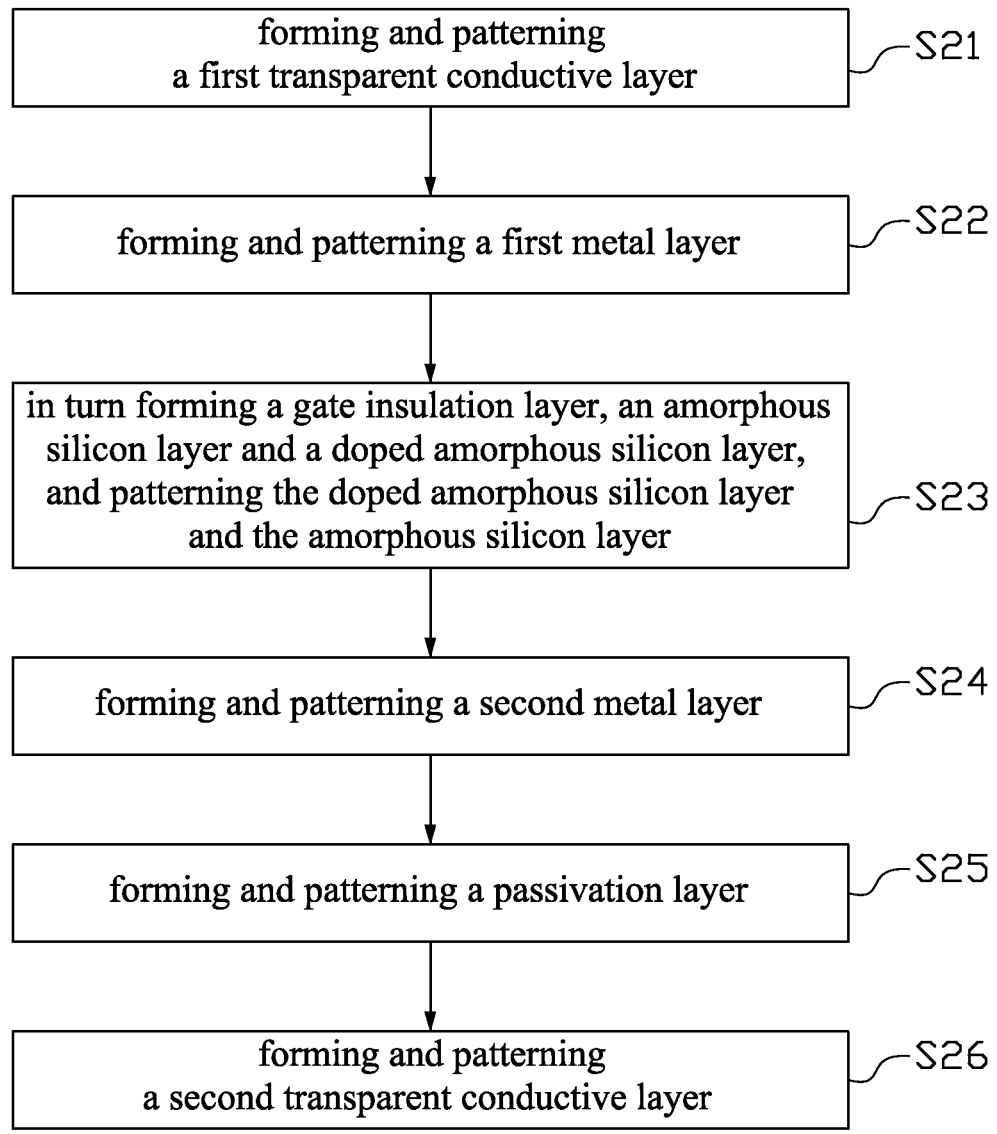
FIG. 22 is a flow chart of manufacturing the first substrate of the LCD of the second embodiment as shown in FIG. 20.

Similarly, the first substrate 200 according to the second embodiment may be manufactured by the following six mask processes, which is, however slightly different from the process for manufacturing the first substrate 100 according to the first embodiment. FIG. 22 is a flow chart showing the manufacturing process/method of the first substrate 200 of the LCD of the second embodiment. The manufacturing process of the first substrate 200 according to the second embodiment will be described in detail hereafter, referring to FIG. 22, FIG. 20 and FIGS. 21a-21c.

Referring to FIG. 22, FIG. 20 and FIGS. 21a-21c, in step S21, a first transparent conductive layer is formed and patterned by a first mask process, in order to form multiple strips of common electrodes 15 electrically connected to each other and triangular protrusion-shaped patterns 150 which are configured on the common electrodes 15 where the common electrodes 15 and the subsequently-formed pixel electrodes 16 are not overlapped.

In step S22, a first metal layer is formed and patterned by a second mask process, in order to form the scanning lines 11, the common electrode bus 13 and the gate electrodes 141 of the thin film transistors 14, wherein the strips of common electrodes 15 are directly electrically connected to the common electrode bus 13.

In step S23, a gate insulation layer 17, an amorphous silicon layer and a doped amorphous silicon layer are formed in turn and the doped amorphous silicon layer and the amorphous silicon layer are patterned by a third mask process, in order to form a semiconductor layer 142 of the thin film transistor 14.

In step S24, a second metal layer is formed and patterned by a fourth mask process, in order to form the data lines 12, the source electrodes 143 and the drain electrodes 144 of the thin film transistors 14.

In step S25, a passivation layer 18 is formed and patterned by a fifth mask process, in order to form the through hole H (see FIG. 20) via which the subsequently-formed pixel electrodes 16 and the drain electrodes 144 of the thin film transistors 14 can be electrically connected and other through holes (not shown) for connecting across circuits.

In step S26, a second transparent conductive layer is formed and patterned by a sixth mask process, in order to form multiple strips of pixel electrodes 16 electrically connected to each other, wherein the pixel electrodes 16 are electrically connected to the drain electrodes 144 of the thin film transistors 14 via the through hole H.

After the above steps S21-S26, the first substrate 200 according to the second embodiment is formed.

The first substrate 200 according to the second embodiment has only slight difference in the manufacturing process as compared from that of the first substrate 100 according to the first embodiment, but they have similar beneficial technical effects which are omitted herewith.

Third Embodiment

Figure 23:
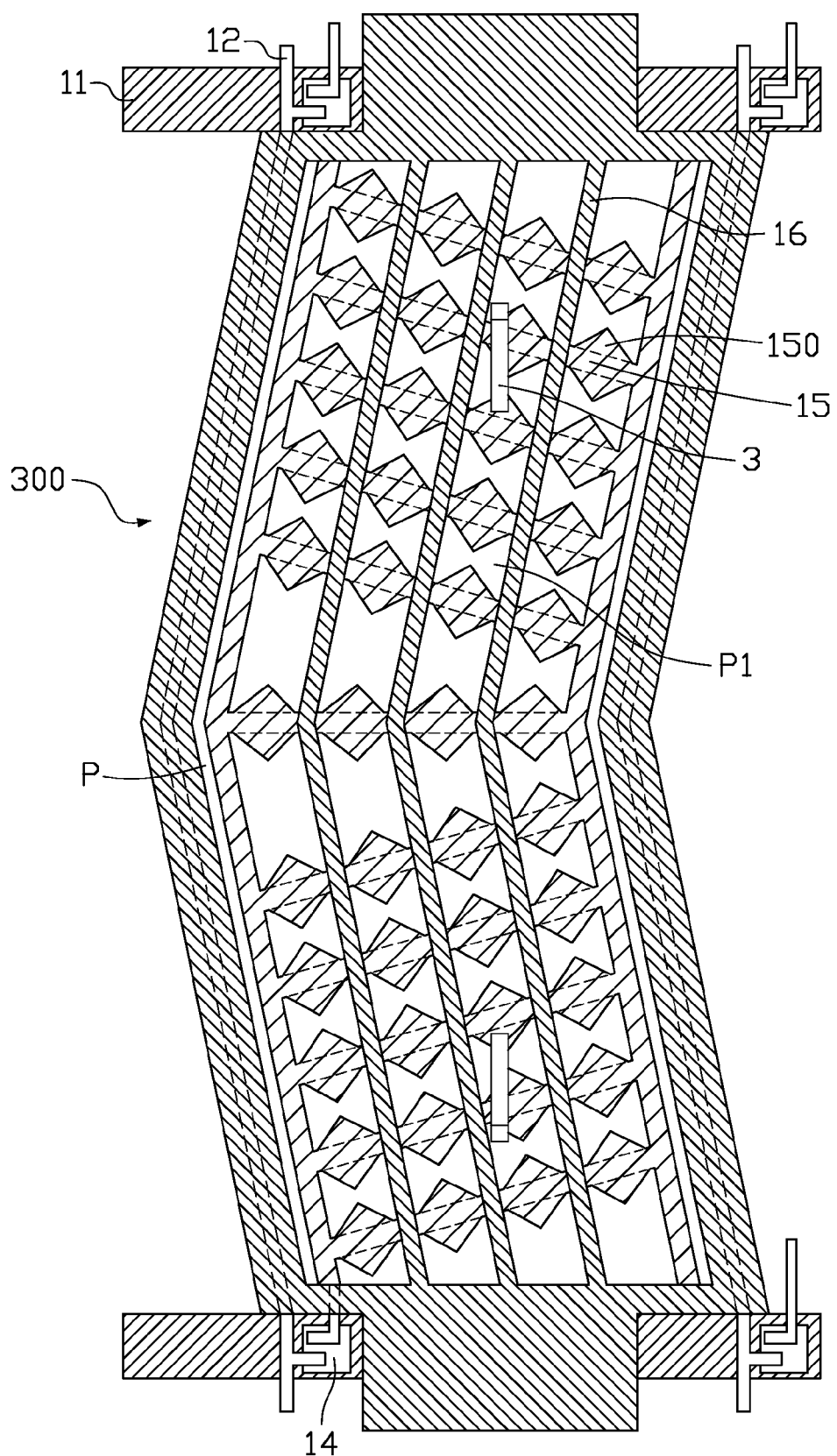
FIG. 23 is a planar view of a first substrate of an LCD according to a third embodiment.
Figure 24:
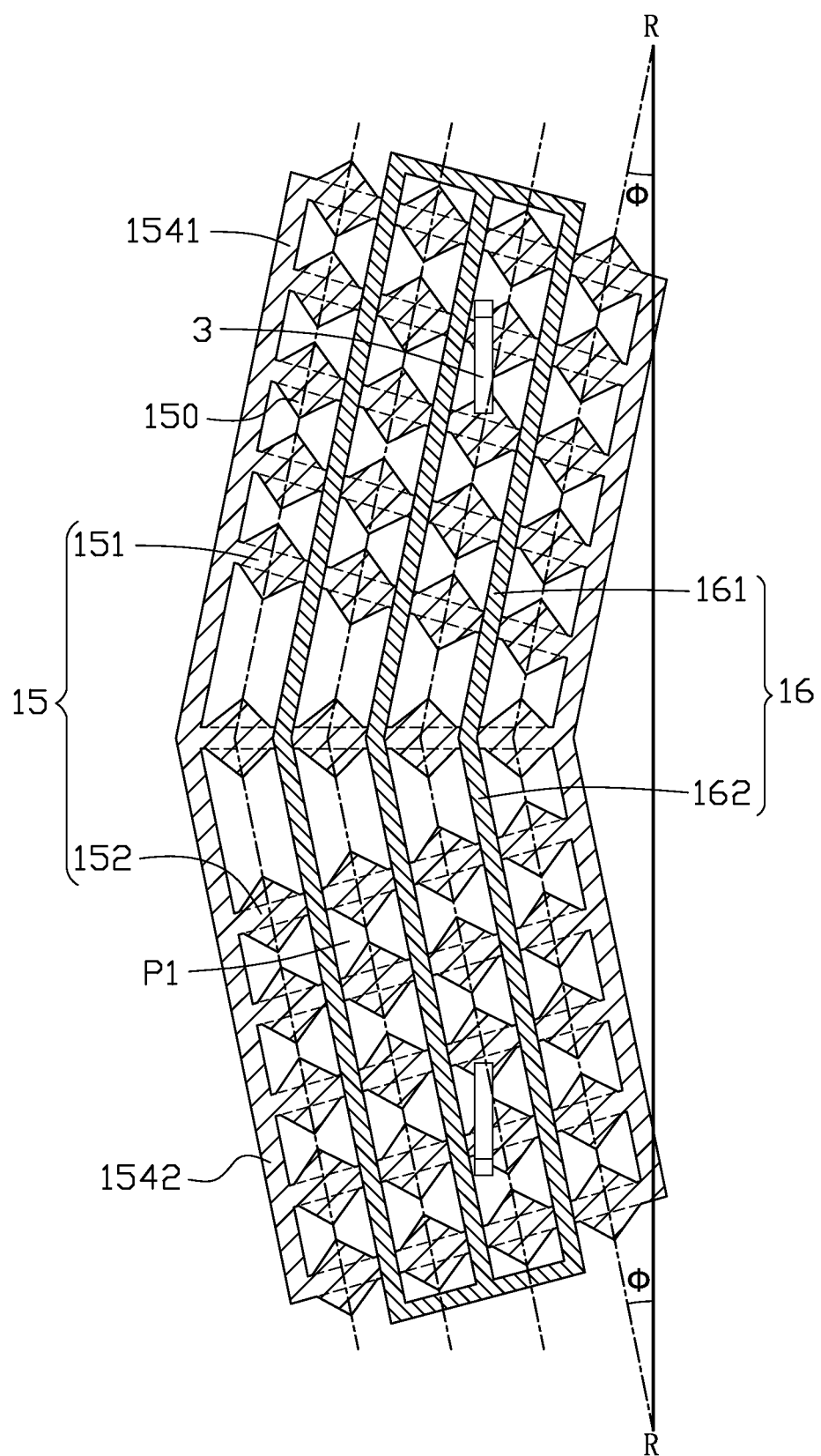
FIG. 24 is a schematic view of first and second electrodes of FIG. 23.

FIG. 23 and FIG. 24 illustrate a first substrate 300 of an LCD according to a third embodiment. It is hereafter to mainly explain the difference of the first substrate 300 according to the third embodiment from the first substrate 100 according to the first embodiment. The same features of the first substrates 100, 300 are omitted here and can make a reference to the description of the first substrate 100. As shown in FIG. 23 and FIG. 24, in the first substrate 300 according to the third embodiment, the second electrodes 16 are not straight but bent, and correspondingly the first electrodes 15 are not entirely in parallel arrangement. The data lines 12 also accordingly are bent in the same way as the second electrodes 16. Each first electrode 15 comprises a first electrode part 151 which is arranged along a first direction, and a second electrode part 152 which is arranged along a second direction different from the first direction. Each second electrode 16 comprises a third electrode part 161 which is intersected with the first electrode parts 151 and arranged along a third direction, and a fourth electrode part 162 which is intersected with the second electrode parts 152 and arranged along a fourth direction. A pixel area P is thus divided into two regions. During operating of the LCD, the liquid crystal molecules 3 can generate two different rotational regions and two domains in one pixel area P. Therefore, the LCD can significantly improve color-difference and achieve a better image display.

In one embodiment, the first electrode parts 151 of the first electrodes 15 are connected to each other through a plurality of first electrode junction bars 1541 which are parallel to the third direction and located at a border of the corresponding pixel area P. The second electrode parts 152 of the first electrodes 15 are connected to each other through a plurality of second electrode junction bars 1542 which are parallel to the fourth direction and located at a border of the corresponding pixel area P.

In the third embodiment, the third direction is perpendicular to the first direction, and the fourth direction is perpendicular to the second direction. In other words, the first electrode parts 151 of the first electrodes 15 and the third electrode parts 161 of the second electrodes 16 are perpendicular to each other, and the second electrode parts 152 of the first electrodes 15 and the fourth electrode parts 162 of the second electrodes 16 are perpendicular to each other.

In the third embodiment, the first electrodes 15 are pixel electrodes and the second electrodes 16 are common electrodes. The triangular protrusion-shaped patterns 150 are disposed on the pixel electrodes.

As shown in FIG. 24, in the third embodiment, an angle φ within a range of 5-20 degrees is defined between the vertex connection direction of the triangular protrusion-shaped patterns 150 facing each other on two adjacent first electrode parts 151 of the first electrodes 15 and the rubbing direction R-R of the first alignment film and the second alignment film. Moreover, an angle cp within a range of 5-20 degrees is also defined between the vertex connection direction of the triangular protrusion-shaped patterns 150 facing each other on two adjacent second electrode parts 152 of the first electrodes 15 and the rubbing direction R-R of the first alignment film and the second alignment film.

Moreover, on the basis of fixing the rubbing direction R-R of the first alignment film and the second alignment film, the second electrodes 16 can be so bent that the angle between the vertex connection direction of the two triangular protrusion-shaped patterns 150 disposed on the first electrode parts 151 and the rubbing direction R-R of the first alignment film and the second alignment film is equal to the angle between the vertex connection direction of the two triangular protrusion-shaped patterns 150 disposed on the second electrode parts 152 and the rubbing direction R-R of the first alignment film and the second alignment film, and both angles are within the range of 5-20 degrees, but toward different directions respectively.

The first substrate 300 according to the third embodiment can be manufactured by a substantially same process as the first substrate 100 according to the first embodiment, which can make a reference to the description of the first substrate 100.

Figure 25:
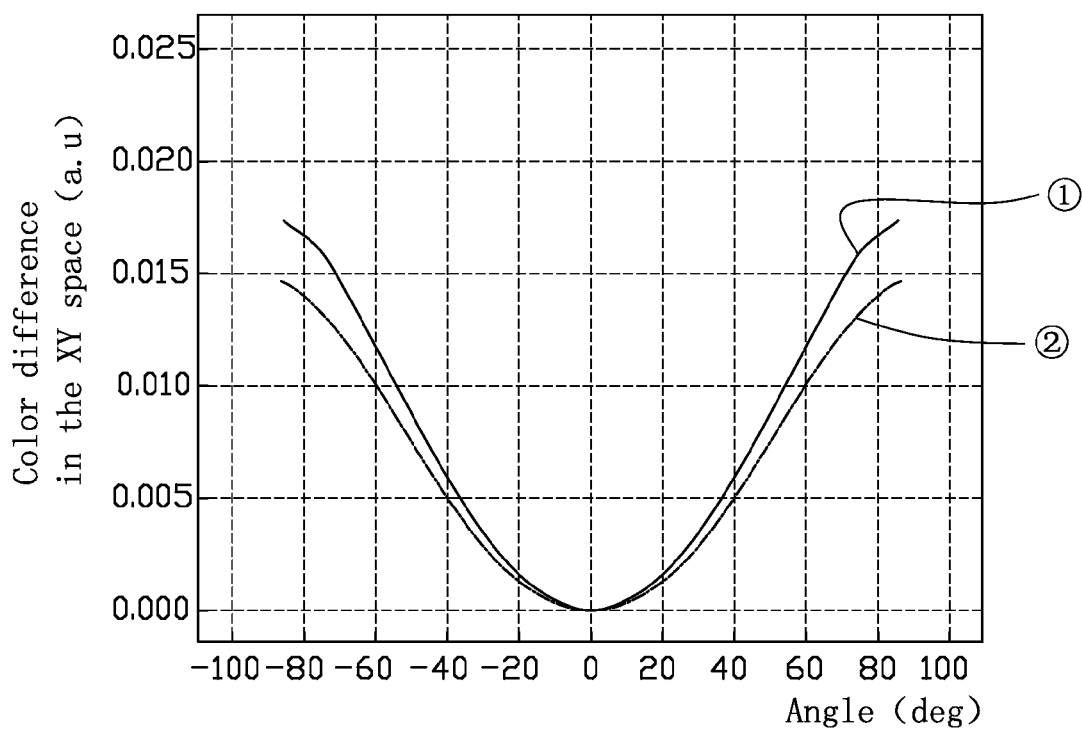
FIG. 25 is a diagram for contrasting the color-difference/angle curve of the LCD according to the third embodiment with that of the existing FFS type LCD.

The LCD with the first substrate 300 according to the third embodiment has similar technical effect to the LCD with the first substrate 100 according to the first embodiment, and furthermore, the LCD with the first substrate 300 according to the third embodiment can further improve color-difference and have better image display. FIG. 25 is a diagram for contrasting the color-difference/angle curve of the LCD according to the third embodiment with that of the existing FFS type LCD. Curve a) is the color-difference/angle curve of the LCD with two domains according to the third embodiment, and curve ② is the color-difference/angle curve of the existing FFS type LCD with two domains. As shown in FIG. 25, it can be seen from curves ① and curve ② in FIG. 25, the LCD with two domains according to the third embodiment is comparable to the existing FFS type LCD with two domains in aspects of color-difference. In the LCD field, it is better that the color-difference value is less than 0.02 in a viewing angle of 60 degrees. It can be seen from curve ① in FIG. 25, the color-difference value of the LCD with two domains according to the third embodiment is about 0.0115 in a viewing angle of 60 degrees, that is able to meet the requirements of the field for the color-difference.

Figure 26:
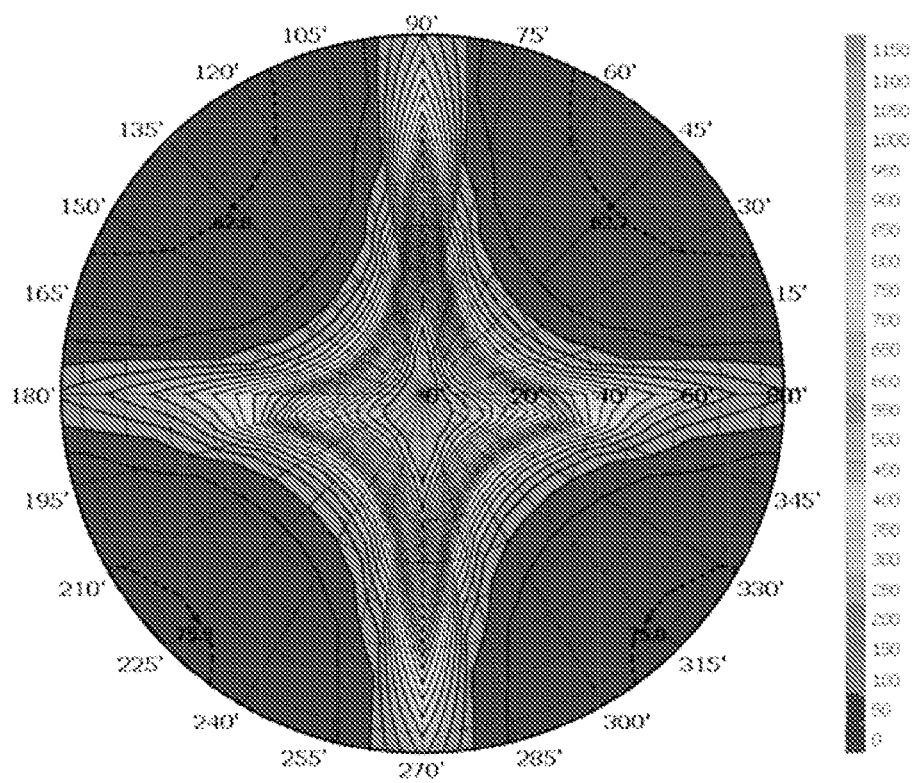
FIG. 26 is a simulated diagram of illustrating contrast ratio of the LCD according to the third embodiment.

FIG. 26 is a simulated diagram of illustrating the contrast ratio of the LCD according to the third embodiment. It can be clearly seen from FIG. 26, the LCD with the first substrate 300 according to the third embodiment has superb high viewing angle and contrast ratio.

It is noted that the second electrodes 16 of the first substrate 200 according to the second embodiment also can be bent similar to the second electrodes 16 of the first substrate 300 according to the third embodiment. The first substrate 200 with bent second electrodes 16 can achieve similar beneficial technical effect similar to that of the first substrate 300, which can make a reference to the description of the first substrate 300 and is omitted herewith.

Fourth Embodiment

Figure 27:
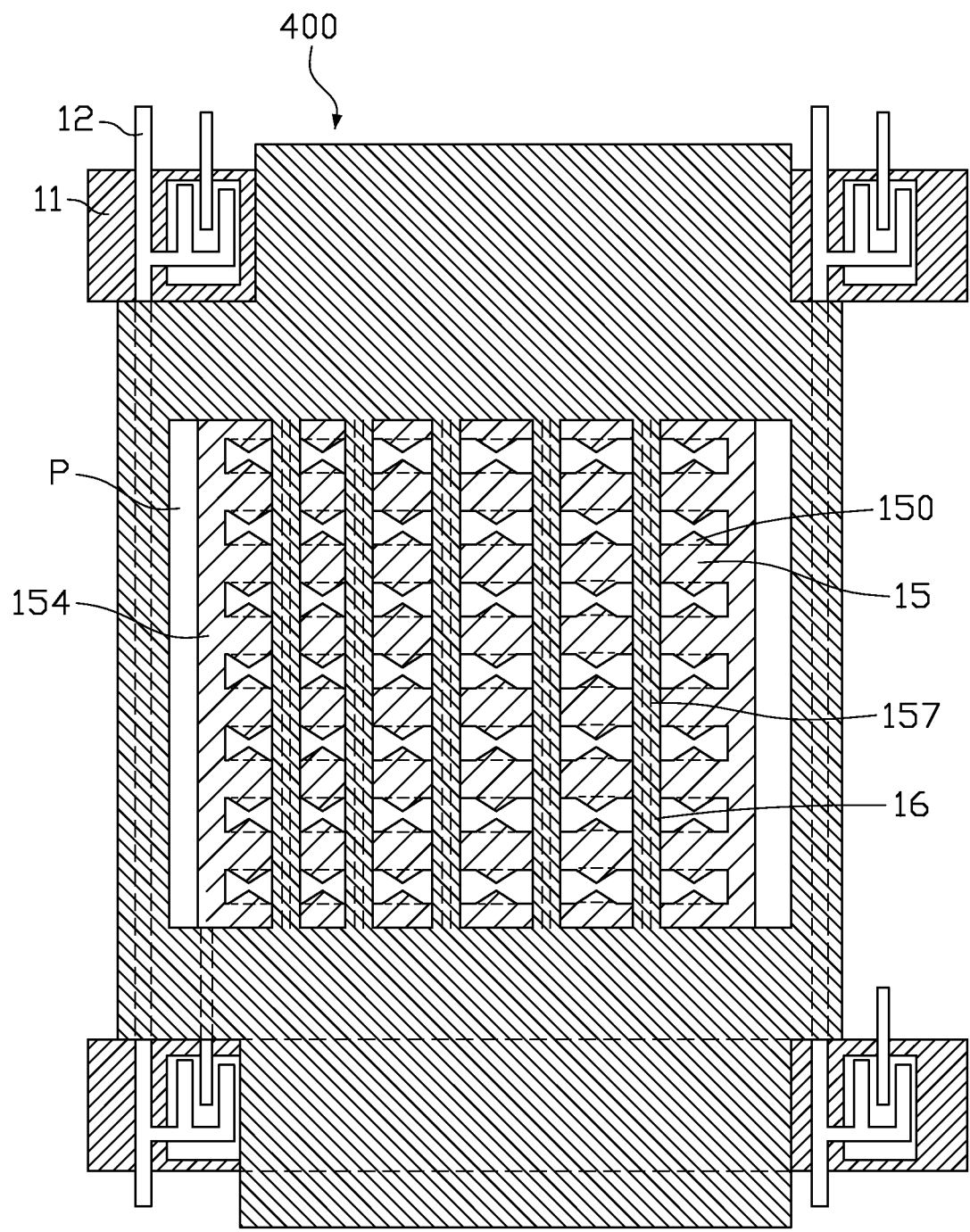
FIG. 27 is a planar view of a first substrate of an LCD according to a fourth embodiment.
Figure 28:
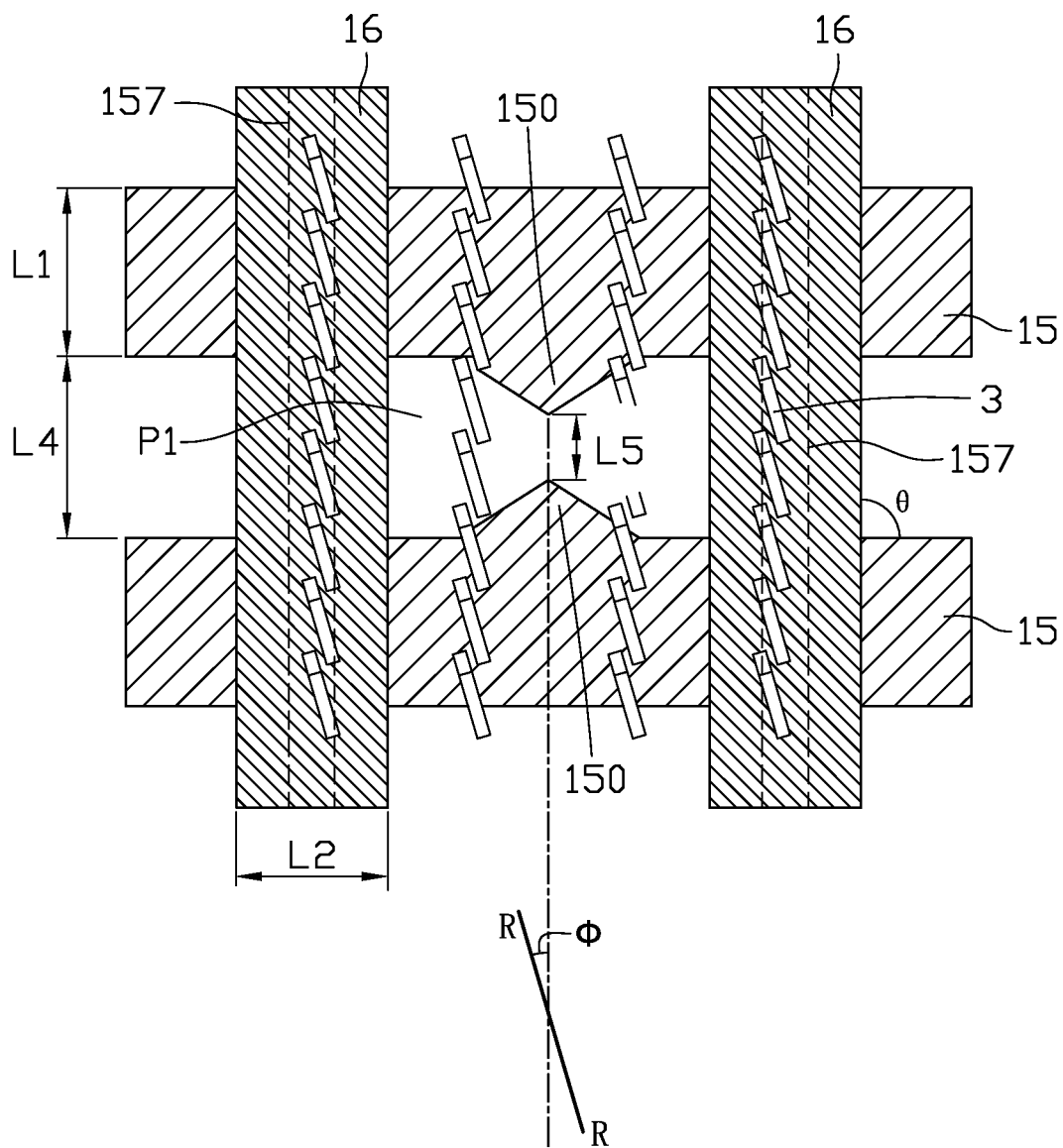
FIG. 28 is a partially enlarged view of a sub-pixel area of FIG. 27.

FIG. 27 and FIG. 28 illustrate a first substrate 400 of an LCD according to a fourth embodiment. For purpose of clarity, FIG. 27 only shows one pixel area P of the first substrate 400. The first substrate 400 of the LCD according to the fourth embodiment is similar to the first substrate 100 according to the first embodiment; however it is hereafter to mainly explain difference of the first substrate 400 according to the fourth embodiment from the first substrate 100 according to the first embodiment. The same features of the first substrates 100, 400 are omitted here and can make a reference to the description of the first substrate 100. As shown in FIG. 27 and FIG. 28, in the first substrate 400 according to the fourth embodiment, the first electrodes 15 are additionally electrically connected to each other through multiple connecting elements 157 which are disposed at a same layer with the first electrodes 15 but at a different layer from the second electrodes 16. The multiple connecting elements 157 are parallel to the second electrodes 16 and positively faced to the second electrodes 16, respectively. For example, each connecting element 157 is disposed directly below the corresponding second electrode 16, so that each connecting element 157 is at least partially overlapped with the corresponding second electrode 16. In addition, the connecting elements 157 can be separated from the second electrodes 16 by the insulating layer. Since the connecting elements 157 are respectively parallel to and faced to the second electrodes 16, the overlapped area of the first electrodes 15 and the second electrodes 16 can be increased, the storage capacitor of the pixel region P can therefore be increased. This can avoid problems due to too low storage capacitor, such as low pixel voltage holding ratio and too large feed-through voltage.

In addition, it can be understood by the persons skilled in the field that the first substrate 400 can be manufactured by a process similar to the first substrate 100, except that the connecting elements 157 is formed during manufacturing the first electrodes 15, i.e., the first electrodes 15 are manufactured together with the connecting elements 157 by the same process.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display, comprising:
    a first substrate;
    a second substrate opposing to the first substrate;
    a liquid crystal layer sandwiched between the first substrate and the second substrate;
    a first alignment film disposed on the first substrate; and
    a second alignment film disposed on the second substrate;
    wherein the first substrate comprises:
        a plurality of scanning lines; and
        a plurality of data lines intercrossed with the plurality of scanning lines to define a plurality of pixel areas;
        wherein each pixel area comprises:
        a plurality of first electrodes which are electrically interconnected together; and
        a plurality of second electrodes which are electrically interconnected together, wherein the first electrodes and the second electrodes are disposed on different layers and mutually intersected to define a plurality of sub-pixel areas;
        wherein each sub-pixel area comprises two protrusion-shaped patterns facing each other and configured on two adjacent first electrodes where the first electrodes and the second electrodes are not overlapped; and
        wherein an angle within a range of 5-20 degrees is defined between a vertex connection direction of the two protrusion-shaped patterns facing each other and a rubbing direction of the first alignment film and the second alignment film.

2. The liquid crystal display as claimed in claim 1, wherein the two protrusion-shaped patterns are disposed on a middle of corresponding first electrodes.

3. The liquid crystal display as claimed in claim 1, wherein the protrusion-shaped patterns are triangular protrusion-shaped patterns or curved protrusion-shaped patterns.

4. The liquid crystal display as claimed in claim 3, wherein internal angles of the protrusion-shaped patterns near corresponding first electrodes are within a range of 0-60 degrees when the protrusion-shaped patterns are triangular protrusion-shaped patterns.

5. The liquid crystal display as claimed in claim 1, wherein one of the first electrode and the second electrode is a pixel electrode and the other of the first electrode and the second electrode is a common electrode.

6. The liquid crystal display as claimed in claim 1, wherein the width of the first electrodes is within a range of 2-5 μm and the width of the second electrodes is within a range of 2-5 μm.

7. The liquid crystal display as claimed in claim 1, wherein the first electrodes are located below the second electrodes, and a gap width between two adjacent first electrodes located in a lower layer is in a range of 0-6 μm, and a gap width between two adjacent second electrodes located in an upper layer is in a range of 3-8 μm.

8. The liquid crystal display as claimed in claim 7, wherein a distance between the vertexes of the two protrusion-shaped patterns is in a range of 0-6 μm.

9. The liquid crystal display as claimed in claim 1, wherein the first electrodes are parallel strips, and the second electrodes are parallel strips.

10. The liquid crystal display as claimed in claim 9, wherein each pixel area further comprises:
    at least one electrode junction bar to electrically connect the first electrodes together, wherein the at least one electrode junction bar is parallel to the second electrodes and located at a border of corresponding pixel area.

11. The liquid crystal display as claimed in claim 1, wherein each pixel area further comprises:
    a plurality of connecting elements to electrically connect the first electrodes together, wherein the plurality of connecting elements are disposed at a same layer with the first electrodes but at a different layer from the second electrodes, and parallel to the second electrodes and positively faced to the second electrodes so that each connecting element is at least partially overlapped with a corresponding second electrode.

12. The liquid crystal display as claimed in claim 1, wherein the first electrodes and the second electrodes are bent, and each first electrode comprises a first electrode part which is arranged along a first direction and a second electrode part which is arranged along a second direction different from the first direction, and wherein each second electrode comprises a third electrode part which is intersected with the first electrodes parts and arranged along a third direction and a fourth electrode part which is intersected with the second electrode parts and arranged along a fourth direction.

13. The liquid crystal display as claimed in claim 12, wherein the third direction is perpendicular to the first direction, and the fourth direction is perpendicular to the second direction.

14. The liquid crystal display as claimed in claim 12, wherein each pixel area further comprises:
    at least one first electrode junction bar to electrically connect the first electrode parts of the first electrodes together, wherein the at least one first electrode junction bar is parallel to the third direction and located at a border of corresponding pixel area; and
    at least one second electrode junction bar to electrically connect the second electrode parts of the first electrodes together, wherein the at least one second electrode junction bar is parallel to the fourth direction and located at a border of corresponding pixel area.

15. The liquid crystal display as claimed in claim 12, wherein the first electrode parts and the third electrode parts are intersected to define the plurality of sub-pixel areas in each of which two protrusion-shaped patterns facing each other are configured on two adjacent first electrode parts, and an angle within a range of 5-20 degrees is defined between a vertex connection direction of the two protrusion-shaped patterns facing each other on the first electrode parts and a rubbing direction of the first alignment film and the second alignment film; and wherein the second electrode parts and the fourth electrode parts are intersected to define the plurality of sub-pixel areas in each of which two protrusion-shaped patterns facing each other are configured on two adjacent second electrode parts, and an angle within a range of 5-20 degrees is defined between a vertex connection direction of the two protrusion-shaped patterns facing each other on the second electrode parts and a rubbing direction of the first alignment film and the second alignment film.

16. The liquid crystal display as claimed in claim 1, wherein an angle between the first electrodes and the second electrodes is within a range of 50-150 degrees.

17. The liquid crystal display as claimed in claim 16, wherein the first electrodes are parallel to the scanning lines or the data lines, and the second electrodes are perpendicular to the first electrodes.

18. The liquid crystal display as claimed in claim 1, wherein each pixel area comprises at least four sub-pixel areas.

* * * * *